United States Patent
Song et al.

(10) Patent No.: US 10,514,665 B2
(45) Date of Patent: Dec. 24, 2019

(54) AUTONOMOUS COMMUNITY ENERGY MANAGEMENT SYSTEM AND METHOD

(71) Applicant: KOREA INSTITUTE OF ENERGY RESEARCH, Daejeon (KR)

(72) Inventors: Yu-jin Song, Daejeon (KR); Yoon-dong Sung, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 122 days.

(21) Appl. No.: 15/938,697

(22) Filed: Mar. 28, 2018

(65) Prior Publication Data

US 2019/0155227 A1 May 23, 2019

(30) Foreign Application Priority Data

Nov. 20, 2017 (KR) .................. 10-2017-0154912

(51) Int. Cl.
*G06F 19/00* (2018.01)
*G05B 13/02* (2006.01)
(Continued)

(52) U.S. Cl.
CPC ..... *G05B 13/0265* (2013.01); *G06Q 30/0207* (2013.01); *H02J 3/383* (2013.01); *H02J 2003/003* (2013.01); *H02J 2003/007* (2013.01)

(58) Field of Classification Search
CPC ........... G05B 13/0265; G06Q 30/0207; G06Q 10/06; G06Q 50/06; H02J 3/383;
(Continued)

(56) References Cited

U.S. PATENT DOCUMENTS 8,548,607 B1 * 10/2013 Belz .................... G06F 7/00
700/21
9,082,141 B2 * 7/2015 Meyerhofer ........... G06Q 50/06
(Continued)

FOREIGN PATENT DOCUMENTS

EP          2852023 A1    3/2015
KR   10-2013-0091573 A   8/2013
(Continued)

OTHER PUBLICATIONS

McNamara, Paul, and Seán McLoone. "Hierarchical demand response for peak minimization using Dantzig-Wolfe decomposition." IEEE Transactions on Smart Grid 6.6 (2015): 2807-2815. (Year: 2015).*
(Continued)

*Primary Examiner* — Michael D Masinick
(74) *Attorney, Agent, or Firm* — Birch, Stewart, Kolasch & Birch, LLP

(57) ABSTRACT

An embodiment provides an energy management system of a community in which a plurality of buildings, each divided into a plurality of zones, are located, the energy management system including: a community agent that is a device managing energy of the community and is configured to receive a first incentive about a Demand Response (DR) or a Frequency Regulation (FR) from a demand management device, calculate a first response capacity responding to the first incentive among a community management capacity, and transmit a second incentive to a building agent; a plurality of building agents, each of which is a device managing energy of a corresponding building and is configured to calculate a second response capacity responding to the second incentive among a building management capacity, and transmit a third incentive to a zone agent; and a plurality of zone agents, each of which is a device managing energy of a corresponding zone and is configured to calculate a third response capacity responding to the third
(Continued)

incentive among a zone management capacity and transmit the third response capacity to a corresponding building agent, wherein each of the building agents is configured to receive third response capacities from the plurality of zone agents, and transmit a fourth response capacity obtained by adding the plurality of third response capacities and the second response capacity to the community agent, and the community agent is configured to receive fourth response capacities from the plurality of building agents, and transmit a fifth response capacity obtained by adding the plurality of fourth response capacities and the first response capacity to the demand management device.

8 Claims, 34 Drawing Sheets

(51) Int. Cl.
    *G06Q 30/02* (2012.01)
    *H02J 3/38* (2006.01)
    *H02J 3/00* (2006.01)

(58) Field of Classification Search
    CPC ........... H02J 2003/003; H02J 2003/007; H02J 2003/146; H02J 3/14; H02J 13/0006
    See application file for complete search history.

(56) References Cited

U.S. PATENT DOCUMENTS

| | | | | |
|---|---|---|---|---|
| 9,595,070 | B2* | 3/2017 | Matsuoka | F24F 11/30 |
| 9,899,837 | B2* | 2/2018 | Carrasco | G06Q 50/06 |
| 10,361,584 | B2* | 7/2019 | Song | H02J 3/32 |
| 2007/0136219 | A1* | 6/2007 | Kim | G06N 20/00 |
| | | | | 706/12 |
| 2012/0041803 | A1* | 2/2012 | Merl | G06Q 30/02 |
| | | | | 705/14.1 |
| 2012/0078687 | A1* | 3/2012 | Ghosh | G06Q 30/0207 |
| | | | | 705/14.1 |
| 2012/0310860 | A1* | 12/2012 | Kim | G06Q 30/08 |
| | | | | 705/412 |
| 2013/0204454 | A1 | 8/2013 | Choi et al. | |
| 2014/0172503 | A1* | 6/2014 | Hammerstrom | G06Q 30/0206 |
| | | | | 705/7.31 |
| 2014/0277769 | A1* | 9/2014 | Matsuoka | F24F 11/30 |
| | | | | 700/278 |
| 2014/0330695 | A1* | 11/2014 | Steven | G06Q 30/0283 |
| | | | | 705/37 |
| 2015/0026109 | A1 | 1/2015 | Park et al. | |
| 2016/0025364 | A1* | 1/2016 | Mills, Jr. | F24F 11/62 |
| | | | | 700/278 |
| 2017/0102162 | A1 | 4/2017 | Drees et al. | |
| 2017/0235848 | A1* | 8/2017 | Van Dusen | H04L 41/04 |
| | | | | 705/12 |
| 2017/0241663 | A1* | 8/2017 | Matsuoka | F24F 11/30 |
| 2018/0046159 | A1* | 2/2018 | Sunamori | G06Q 50/06 |
| 2018/0138742 | A1* | 5/2018 | Song | H02J 13/0006 |

FOREIGN PATENT DOCUMENTS

| | | |
|---|---|---|
| KR | 10-2014-0015745 A | 2/2014 |
| KR | 10-2015-0000602 A | 1/2015 |
| KR | 10-2015-0009375 A | 1/2015 |
| KR | 10-2015-0047989 A | 5/2015 |
| KR | 10-2016-0034488 A | 3/2016 |
| KR | 10-1753907 B1 | 7/2017 |

OTHER PUBLICATIONS

Bhattarai, Bishnu Prasad, et al. "Hierarchical control architecture for demand response in smart grids." 2013 IEEE PES Asia-Pacific Power and Energy Engineering Conference (APPEEC). IEEE, 2013. (Year: 2013).*

Samarakoon, Kamalanath, Janaka Ekanayake, and Nick Jenkins. "Reporting available demand response." IEEE Transactions on Smart Grid 4.4 (2013): 1842-1851. (Year: 2013).*

Gkatzikis, Lazaros, Iordanis Koutsopoulos, and Theodoros Salonidis. "The role of aggregators in smart grid demand response markets." IEEE Journal on selected areas in communications 31.7 (2013): 1247-1257. (Year: 2013).*

Caron, Stéphane, and George Kesidis. "Incentive-based energy consumption scheduling algorithms for the smart grid." 2010 First IEEE International Conference on Smart Grid Communications. IEEE, 2010. (Year: 2010).*

Palensky, Peter, and Dietmar Dietrich. "Demand side management: Demand response, intelligent energy systems, and smart loads." IEEE transactions on industrial informatics7.3 (2011): 381-388. (Year: 2011).*

* cited by examiner

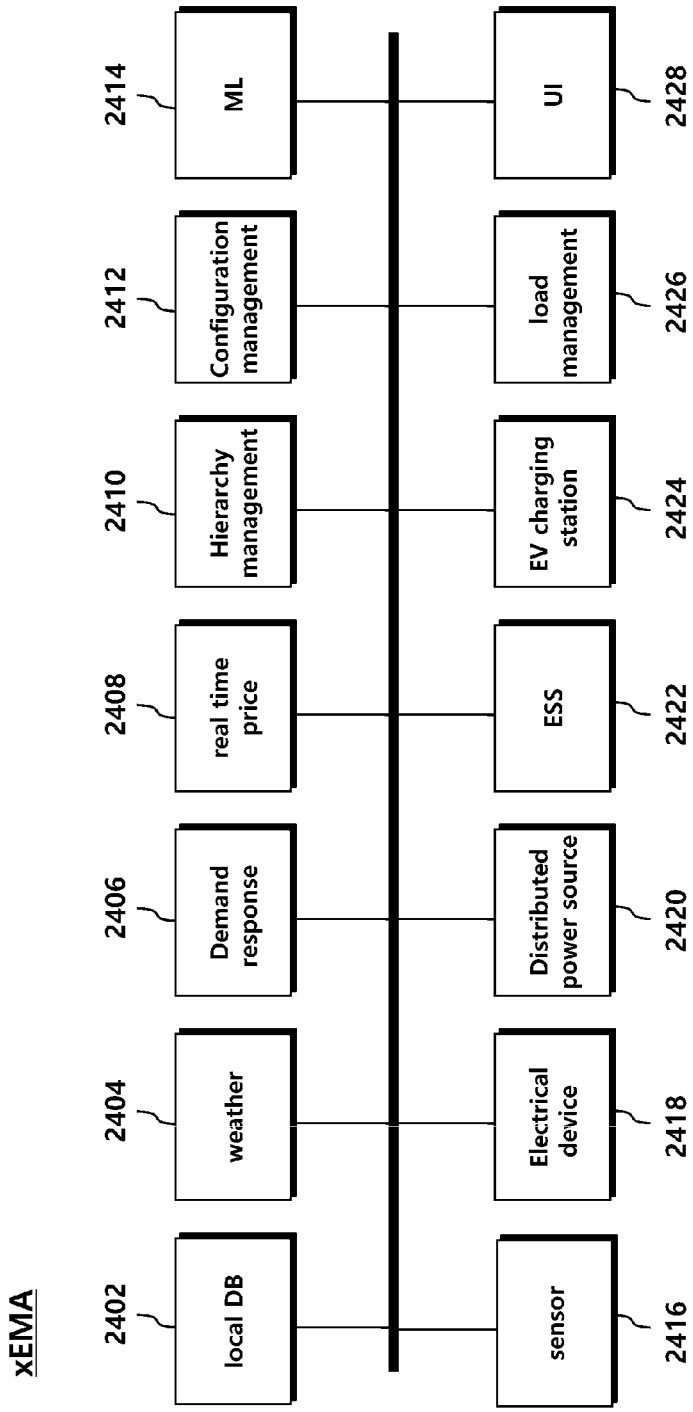

AUTONOMOUS COMMUNITY ENERGY MANAGEMENT SYSTEM AND METHOD

CROSS REFERENCE TO RELATED APPLICATION

This application claims priority from Korean Patent Application No. 10-2017-0154912, filed on Nov. 20, 2017, which is hereby incorporated by reference for all purposes as if fully set forth herein.

FIELD OF THE INVENTION

The present embodiment relates to a technology for managing energy of a community.

DESCRIPTION OF THE PRIOR ART

Recently, rapid increase in energy demand has aggravated a power shortage phenomenon. In order to relieve the power shortage phenomenon, power generation and power transmission and distribution facilities are additionally installed. However, the additional installation causes a rapid increase in social costs and a delay in power supply expansion. Accordingly, a government converts from a supply-centered energy policy of the past into a demand management-centered energy policy.

Power demand management corresponds to a method of minimizing cost and stably satisfying a power demand by changing the power use patterns of consumers. Power demand management may be divided into a demand response and an improvement in energy efficiency. The power demand management as described above may exhibit a remarkable effect when it is applied to a building, a house, and a factory.

Recently, various smart grid technologies, such as a new regeneration energy, for example, a sunlight, an LED lamp, an Energy Storage System (ESS), an electric car, a smart meter, etc., are introduced into a building. Accordingly, a market demand for a technology relating to a Building Energy Management System (BEMS), a Home Energy Management System (HEMS), and a Factory Management System (FEMS) which controls the power consumption of the building through integrated operation of the smart grid technologies has been increased.

However, the conventional BEMS, HEMS, and FEMS adopt a centralized integrated control scheme, and thus fail to reflect a difference between environments of detailed zones.

For example, in applying a demand response incentive policy, the conventional technology applies a single demand response incentive policy to the entire region (the entire community region or the entire building region). However, because there is a difference in environment between detail zones and the tendencies of users who reside in a corresponding zone are also different, it is difficult to achieve an overall high performance by using the single demand response incentive policy. Also, when a system responds to a demand response with increased compulsion, user convenience is lowered.

Further, the conventional BEMS, HEMS, and FEMS adopt a centralized integrated control scheme, and thus cannot flexibly handle the breakdown of some configurations. Moreover, the systems should be fixed every time when a new configuration is added thereto.

In addition, the centralized integrated control scheme manages and controls the entire configuration by using a single EMS algorithm. However, the scheme controls blocks having different power use patterns by a single Energy Management System (EMS) algorithm. Therefore, energy supply for each power use pattern cannot be not optimized.

In addition, the centralized integrated control scheme fails to effectively manage a local load change generated according to zones of a building.

In addition, the centralized integrated control scheme requires modification and recompilation of the entire EMS whenever a device is added or removed, thereby increasing a maintenance cost.

In addition, the centralized integrated control scheme is inadequate to reflect the current occupied status, the energy use pattern, and the convenience of a resident.

SUMMARY OF THE INVENTION

In this background, an aspect of the present disclosure is to provide an Energy Management System (EMS) technology reflecting various (energy) environments in zones of a building.

Another aspect of the present disclosure is to provide an EMS technology in which the reliability of the entire system does not degrade even when some breakdown occurs.

Another aspect of the present disclosure is to provide an EMS technology in which a device can be plug and play (Plug & Play).

Another aspect of the present disclosure is to provide an EMS technology reflecting the current occupied status, the energy use pattern, and the convenience of a resident.

Another aspect of the present disclosure is to provide an EMS technology allowing user convenience and an energy cost according to zones in a building to be optimally determined.

Another aspect of the present disclosure is to provide an EMS technology in which the problem of a conventional top-down scheme (a centralized integrated control scheme) can be solved, and an energy management policy for the entire region can be determined by reflecting an independent energy management policy for each zone.

In accordance with the above aspect, an embodiment provides an energy management system of a community in which a plurality of buildings, each divided into a plurality of zones, are located, the energy management system including: a community agent that is a device managing energy of the community and is configured to receive a first incentive about a Demand Response (DR) or a Frequency Regulation (FR) from a demand management device, calculate a first response capacity responding to the first incentive among a community management capacity, and transmit a second incentive to a building agent; a plurality of building agents, each of which is a device managing energy of a corresponding building and is configured to calculate a second response capacity responding to the second incentive among a building management capacity and transmit a third incentive to a zone agent; and a plurality of zone agents, each of which is a device managing energy of a corresponding zone and is configured to calculate a third response capacity responding to the third incentive among a zone management capacity and transmit the third response capacity to a corresponding building agent, wherein each of the building agents is configured to receive third response capacities from the plurality of zone agents and transmit a fourth response capacity obtained by adding the plurality of third response capacities and the second response capacity to the community agent, and the community agent is configured to receive fourth response capacities from the plurality of building agents and transmit a fifth response capacity obtained by adding the plurality of fourth response capacities and the first response capacity to the demand management device.

The community agent may determine the second incentive to maximize an incentive profit determined by a difference between the first incentive and the second incentive and the fourth response capacity.

Each of the zone agents may determine the third response capacity to maximize an objective function including an incentive profit and a user satisfaction degree, the incentive profit may be determined by the third incentive and the third response capacity, and the user satisfaction degree is a quantified value and may be reduced by the third response capacity.

The community management capacity is an energy capacity directly managed by the community agent, and may include a community common load capacity and a community distributed power source capacity.

The first response capacity may include an estimated amount of power generation of a solar photovoltaic power generator and a dischargeable capacity of an Energy Storage System (ESS), which are directly managed by the community agent.

The community agent may calculate a response capacity responding to the first incentive among the community common load capacity through machine learning including, as input data, occupant information of the community.

Each of the zone agents may generate occupant information of a corresponding zone through machine running including, as input data, a part among pieces of data generated in the corresponding zone. The community agent may gather occupant information of each zone to generate occupant information of the community.

Each of the building agents may further receive incentive information from the community agent, the incentive information may include a load capacity ranking and an incentive ranking of a building corresponding to a relevant building agent among all the buildings of the community, and the second response capacity may be calculated through machine learning including, as input data, the load capacity ranking and the incentive ranking.

The second response capacity and the third incentive may be calculated through machine learning including, as input data, the load capacity ranking and the incentive ranking.

Another embodiment provides an energy management system of a building divided into a plurality of zones, the energy management system including: a building agent that is a device managing energy of the building and is configured to receive a first incentive about a Demand Response (DR) or a Frequency Regulation (FR) from a community agent configured to manage energy of a community including the building, calculate a first response capacity responding to the first incentive among a building management capacity, and transmit a second incentive to a zone agent; and a plurality of zone agents, each of which is a device managing energy of a corresponding zone and is configured to, when the each of zone agents does not participate in the demand response or the frequency regulation (case 1), estimate an energy demand amount (a first energy demand amount) of the corresponding zone through machine learning (first machine learning) or calculation, when the each of zone agents participates in the demand response or the frequency regulation (case 2), estimate an energy demand amount (a second energy demand amount) of the corresponding zone through machine learning (second machine learning), determine, as a second response capacity responding to the second incentive, a difference between the first energy demand amount and the second energy demand amount, and transmit the determined second response capacity to the building agent, wherein the building agent is configured to receive second response capacities from the plurality of zone agents and transmit a third response capacity obtained by adding the plurality of second response capacities and the first response capacity to the community agent, and the second machine learning includes, as input data, the first energy demand amount and the second incentive, and calculates the second energy demand amount to maximize an objective function including an incentive profit obtained by the second incentive and the second response capacity and a quantified user satisfaction degree.

Each of the zone agents may configure whether to allow each occupant of the corresponding zone to participate in the demand response or in the frequency regulation.

Each of the zone agents may store user configurations for case 1 and case 2, respectively.

Each of the zone agents may store the user configuration for case 1 to be a particular value, and may store the user configuration for case 2 to be a range. Each of the zone agents may quantify a user satisfaction degree for each detail section in the range and store a quantified value of the degree.

Each of the zone agents may further receive incentive information from the building agent, the incentive information may include a load capacity ranking and an incentive ranking of a zone corresponding to a relevant zone agent among all the zones of the building, and the second energy demand capacity may be calculated through the second machine learning including, as input data, the load capacity ranking and the incentive ranking The second machine learning may be independently executed for each zone and may fail to recognize the second incentive of a different zone.

The building agent and the plurality of zone agents may determine an internal variable through machine learning, and machine learnings corresponding to the building agent and the plurality of zone agents may be operated independently and in parallel to each other.

Another embodiment provides an energy management method of a community in which a plurality of buildings, each divided into a plurality of zones, are located, the energy management method including: receiving, by a community agent configured to manage energy of the community, a first incentive about a Demand Response (DR) or a Frequency Regulation (FR) from a demand management device; receiving, by the community agent, a first DR/FR signal corresponding to the first incentive; controlling, by the community agent, a first response capacity responding to the first incentive among a community management capacity in response to the first DR/FR signal; transmitting, by the community agent, a second incentive to a building agent; transmitting, by the community agent, a second DR/FR signal corresponding to the second incentive to the building agent; receiving, by the building agent configured to manage energy of a corresponding building, the second incentive; receiving, by the building agent, the second DR/FR signal; controlling, by the building agent, a second response capacity responding to the second incentive among a building management capacity in response to the second DR/FR signal; transmitting, by the building agent, a third incentive to a zone agent; and controlling, by the zone agent configured to manage energy of a corresponding zone, a third response capacity responding to the third incentive among a zone management capacity, to participate in the demand response or the frequency regulation, wherein the transmitting of the second DR/FR signal includes transmitting, by the community agent, different second DR/FR signals to at least two building agents according to a load characteristic for each building.

A load characteristic of each building may be determined by a peak power time period of each building, and the community agent may transmit different second DR/FR signals according to a peak power time period for each building.

A load characteristic of each building may be determined to be a response time to the second DR/FR signal.

The community agent may differently determine the second incentive or the second DR/FR signal according to a degree of compliance and a degree of contribution for each building with respect to the demand response or the frequency regulation.

The building agent may control a thermal energy device to accumulate thermal energy in the building in a time period in which a price of power is low, in consideration of thermal dynamics of the building.

As described above, according to the present embodiment, an EMS device can reflect various (energy) environments in zones of a building, even when some breakdown occurs, the reliability of the entire system does not degrade, a device can be plug and play (Plug & Play), the current occupied status, the energy use pattern, and the convenience of a resident can be reflected. In addition, the present disclosure can provide an energy management system technology allowing user convenience and an energy cost according to zones in a building to be optimally determined. Moreover, according to the present disclosure, the problem of a conventional top-down scheme (a centralized integrated control scheme) can be solved, and an energy management policy for the entire region can be determined by reflecting an independent energy management policy for each zone.

BRIEF DESCRIPTION OF THE DRAWINGS

The above and other aspects, features and advantages of the present disclosure will be more apparent from the following detailed description taken in conjunction with the accompanying drawings, in which:

FIG. 34 is an internal configuration diagram of an xEMA.

DETAILED DESCRIPTION OF THE EXEMPLARY EMBODIMENTS

Figure 1:
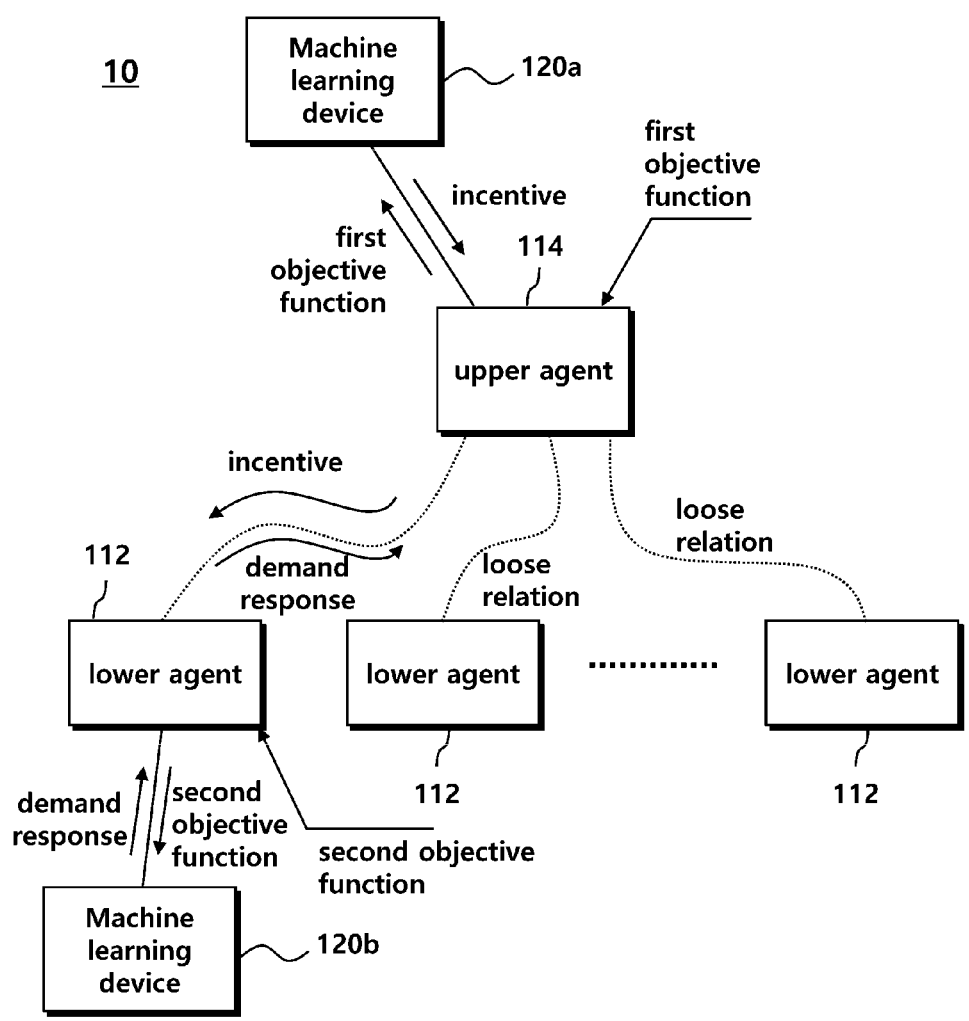
FIG. 1 is a conceptual diagram showing a relation between an upper agent and a lower agent in an energy management system according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing elements of the present disclosure. These terms are merely used to distinguish one element from other elements, and a property, an order, a sequence and the like of a corresponding element are not limited by the term. It should be noted that if it is described in the specification that one element is "connected" "coupled" or "joined" to another element, a third element may be "connected" "coupled" and "joined" between the first and second elements, although the first element may be directly connected, coupled or joined to the second element.

In one embodiment, an energy management system includes a plurality of agent devices, and each agent device is controlled independently. Each agent device is hierarchically disposed. However, adopted is a scheme in which an upper agent is connected to a lower agent with a loose relation, rather than forcibly controlling the lower agent.

FIG. 1 is a conceptual diagram showing a relation between an upper agent and a lower agent in an energy management system according to an embodiment.

Referring to FIG. 1, an energy management system 10 may include at least one upper agent 114 and a plurality of lower agents 112.

The upper agent 114 and the lower agent 112 may be connected to each other with a loose relation. A loose relation may mean a relation in which the upper agent 114 transmits an indirect control signal to the lower agent 112, rather than transmitting a compulsory control signal. In a loose relation, the lower agent 112 may be operated in response to an indirect control signal transmitted by the upper agent 114, and may be operated otherwise. For example, when the upper agent 114 transmits a control signal requesting a Demand Response (DR) to the lower agent 112, the lower agent 112 may comply with the control signal or may not.

In the energy management system 10 according to an embodiment, the upper agent 114 and the lower agent 112 are connected with a loose relation. However, the entire energy management system 10 may include other control elements in order to achieve a particular purpose. One among the control elements is a condition control signal suggested by the upper agent 114. For example, the upper agent 114 may transmit an incentive signal in order to induce the lower agent 112 to perform an operation according to a demand response. The rationally operated lower agent 112 may be operated in response to a demand response request of the upper agent 114 in order to obtain an incentive.

The rationally operated lower agent 112 may be technically operated in accordance with an objective function. The lower agent 112 may include an objective function (a second objective function) which maximizes a gain in use of power, and may respond to a demand response request of the upper agent 114 in order to maximize the second objective function.

The upper agent 114 may also be operated in accordance with a particular objective function (a first objective function). The upper agent 114 may have an objective function which minimizes the usage of energy in the entire energy management system 10, generate an incentive according to the objective function, and transmit the generated incentive to the lower agent 112. For another example, the upper agent 114 may have an objective function which maximizes a self-gain due to a demand response, and may generate an incentive according to the objective function to the lower agent 112.

In the latter case, the upper agent 114 should determine an incentive to have a proper level in order to increase a demand response participation amount of the lower agent 112 and decrease an incentive provided to the lower agent 112. To determine an optimal variable (incentive), the upper agent 114 may utilize a machine learning device 120a. The upper agent 114 may transmit data relating to its own objective function to the machine learning device 120a, receive the value of a variable, for example, an incentive, from the machine learning device 120a, and then may use the received value to control the lower agent 112.

The lower agent 112 may transmit its own objective function and data relating to the objective function to the machine learning device 120b in order to maximize the value of the objective function, receive the value of a variable, for example, a demand response, from the machine learning device 120a, and then may use the received value to respond to a request of the upper agent 114.

In an energy management system according to an embodiment, agent devices may be hierarchically arranged.

Figure 2:
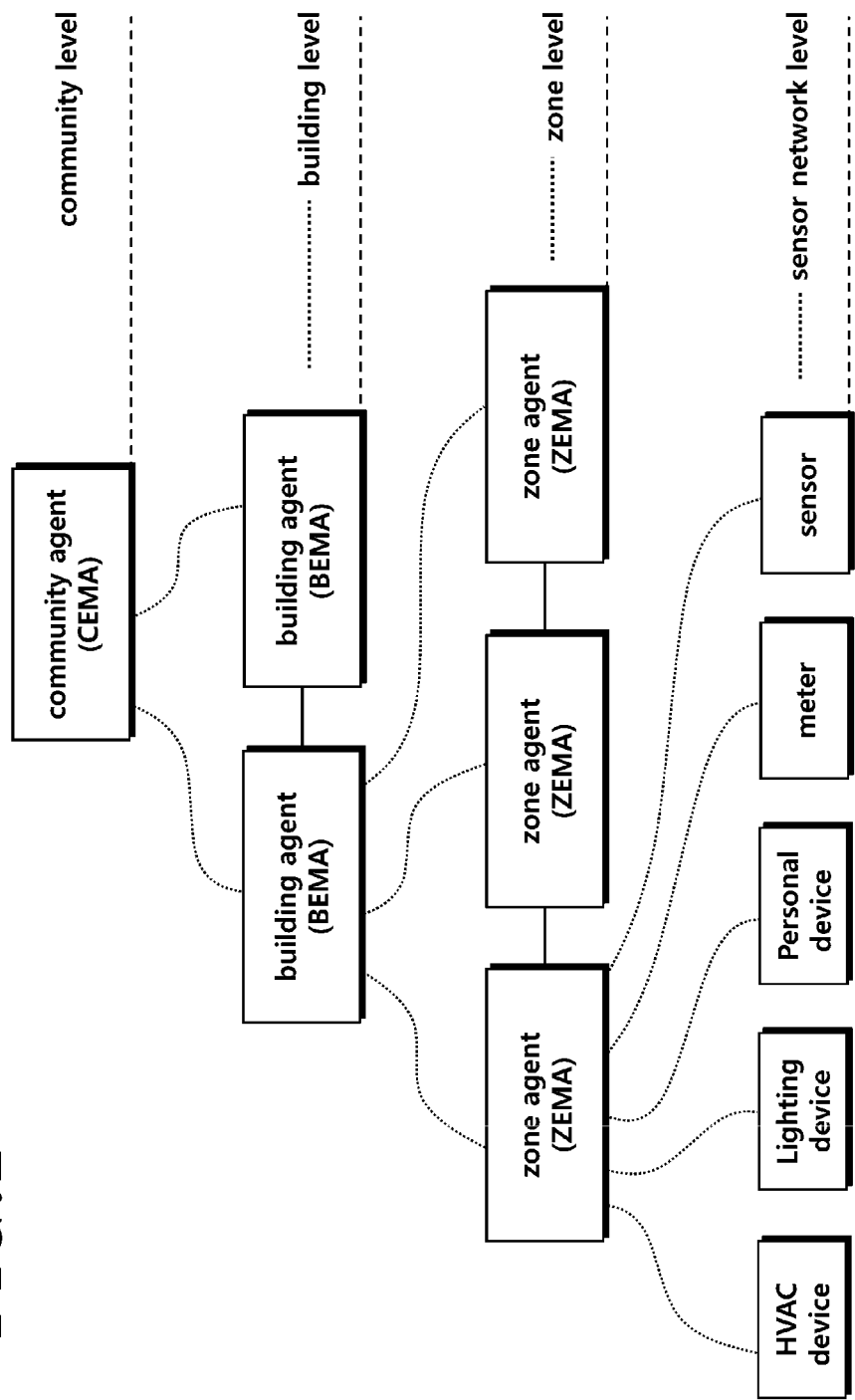
FIG. 2 is a hierarchical structure diagram of an energy management system according to an embodiment.

FIG. 2 is a hierarchical structure diagram of an energy management system according to an embodiment.

Referring to FIG. 2, a community agent (Community Energy Management Agent, CEMA) is located in a highest community level, and at least one building agent (Building Energy Management Agent, BEMA) connected to the community agent (CEMA) is located in a next building level. At least one zone agent (Zone Energy Management Agent, ZEMA) connected to each building agent (BEMA) is located in a next zone level. In each zone agent (ZEMA), located are an energy device (for example, an HVAC device, a lighting device, etc.), a personal device (for example, a Personal Computer (PC), etc.), a meter, a sensor, etc., all of which are located in a lowest sensor network level.

Respective agents (CEMA, BEMA, and ZEMA) may be connected with a loose relation as described with reference to FIG. 1.

Figure 3:
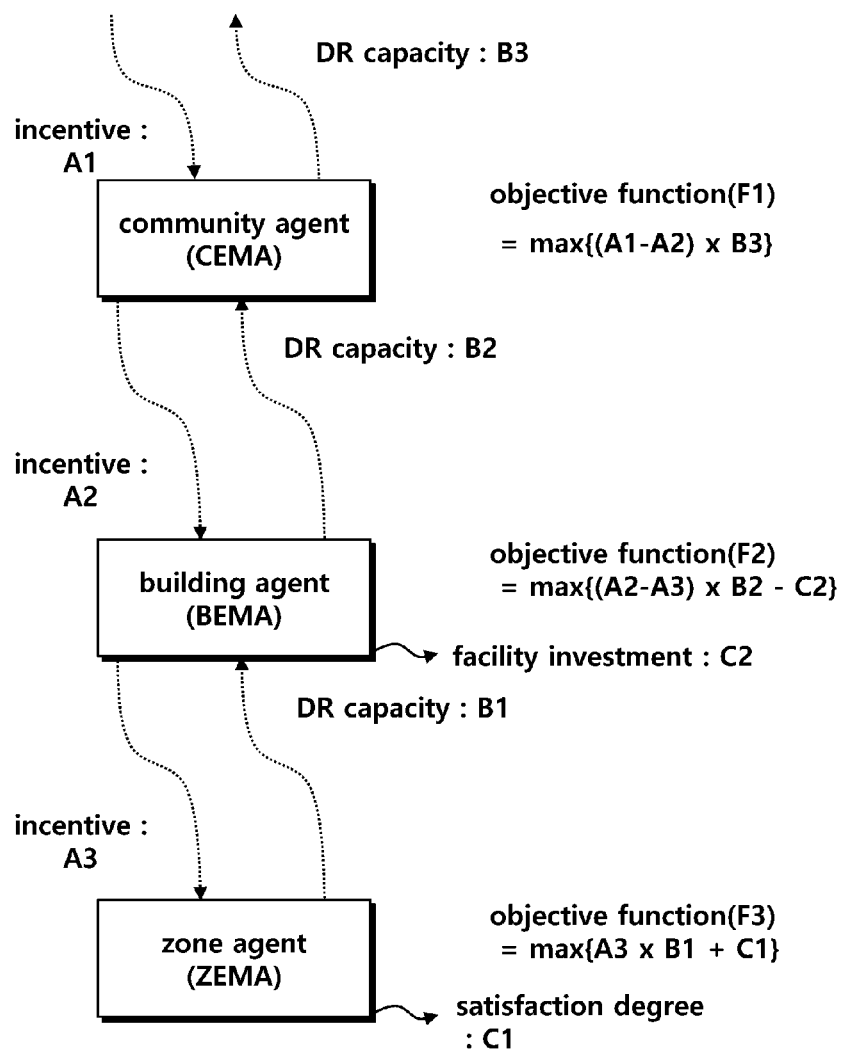
FIG. 3 is a diagram showing a relation between hierarchies and an objective function of each agent in an energy management system of a community according to an embodiment.

FIG. 3 is a diagram showing a relation between hierarchies and an objective function of each agent in an energy management system of a community according to an embodiment.

Referring to FIG. 3, a community agent (CEMA) is disposed in a highest layer of the energy management system, and the community agent (CEMA) may include a first objective function (F1) which maximizes an incentive profit. The community agent (CEMA) may receive a first incentive (A1) from a demand management device, and may provide a second incentive (B2) to a building agent (BEMA) according to a demand response capacity of the building agent (BEMA) disposed lower than the community agent. The first objective function (F1) may be defined as a function of maximizing a value obtained by multiplying a value obtained by subtracting the second incentive (A2) from the first incentive (A1), by a demand response capacity (B3) of the community. In this case, a capacity (a community management capacity) which is directly managed by the community agent (CEMA) and does not belong to each building is not considered, and this configuration will be described later.

In an intermediate layer of the energy management system, the building agent (BEMA) is disposed, and the community agent (CEMA) may control the building agent (BEMA) through the second incentive (A2). The building agent (BEMA) may control a zone agent (ZEMA) disposed lower than the building agent, through a third incentive (A3). The building agent (BEMA) may include a second objective function (F2). The second objective function (F2) may be defined as a function of maximizing an amount obtained by subtracting an equipment investment cost (C2) from an incentive profit. The incentive profit may be defined to be a value obtained by multiplying a value obtained by subtracting the third incentive (A3) from the second incentive (A2), by a demand response capacity (B2) of a building. In this case, a capacity (a building management capacity) which is directly managed by the building agent (BEMA) and does not belong to each zone is not considered, and this configuration will be described later.

The zone agent (ZEMA) is disposed in a lowest layer of the energy management system, and the zone agent (ZEMA) may include a third objective function (F3) which maximizes a sum of an incentive profit and a user satisfaction degree. The third objective function (F3) may be defined to be a sum of a value obtained by multiplying the third incentive (A3) and a demand response capacity (B1) of the zone agent (ZEMA), and a user satisfaction degree (C1). The user satisfaction degree (C1) may be configured to have a quantified value.

Figure 4:
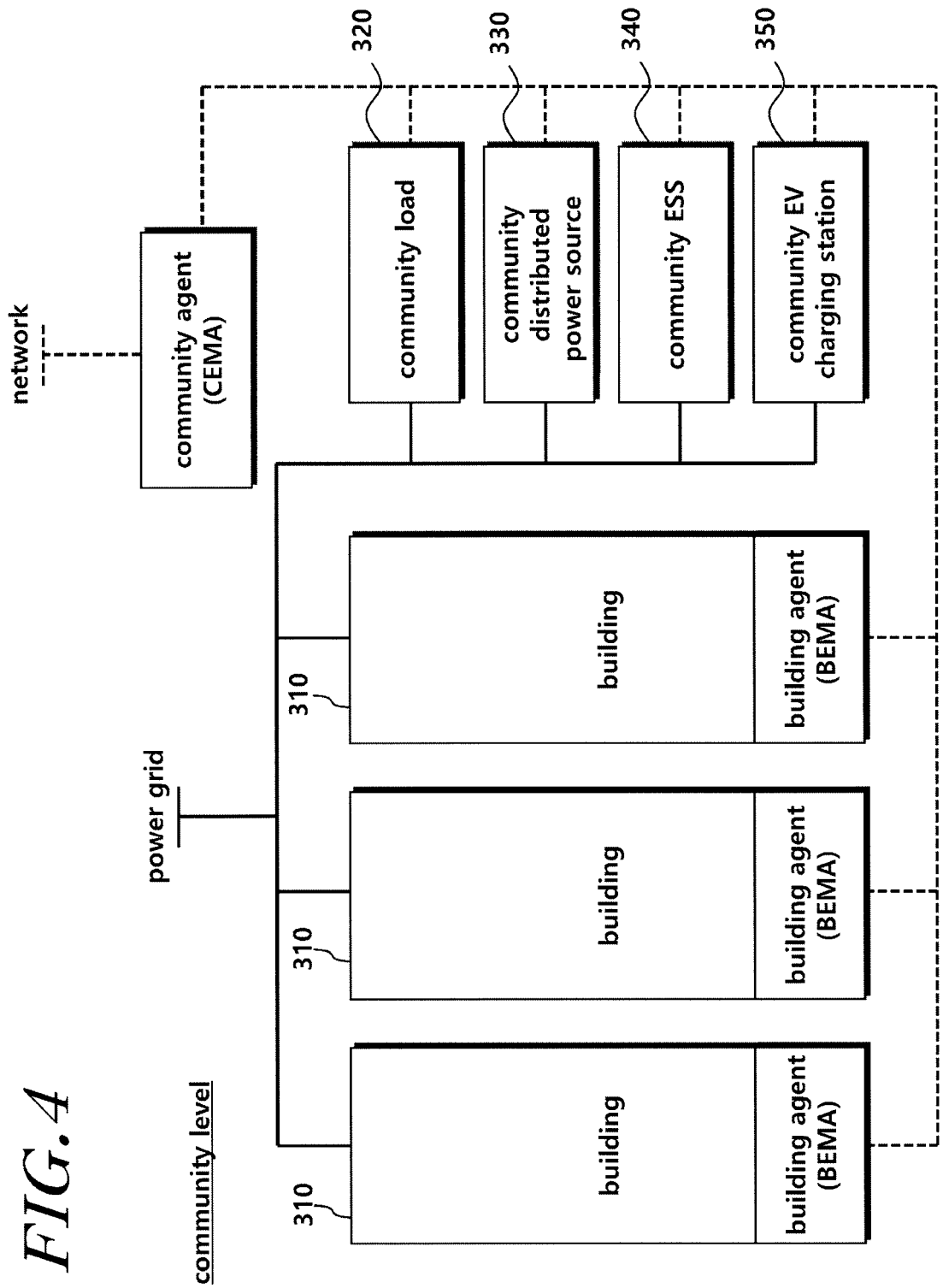
FIG. 4 is a system configuration diagram of a community level.

FIG. 4 is a system configuration diagram of a community level.

Referring to FIG. 4, at least one building 310 is located in a community. The community may include community devices not belonging to the building 310. For example, the community may include a community load 320: a street lamp, a traffic signal system, etc. The community may include a community distributed power source 330, a community Energy Storage System (ESS) 340, a community Electric Vehicle (EV) charging station 350, etc., as a community device.

The community may include all of the aforementioned community devices, for example, the community load 320, the community distributed power source 330, the community ESS 340, and the community EV charging station 350, and may include only at least one community device among them.

A community agent (CEMA) that manages the entire community energy is located in the community. The community agent (CEMA) is connected to a building agent (BEMA) located in each building 310, and controls each building agent (BEMA). Also, the community agent (CEMA) is connected to the community devices 320, 330, 340, and 350 which do not belong to the buildings, obtains state info/illation of the community devices 320, 330, 340, and 350, and controls the community devices 320, 330, 340, and 350.

Figure 5:
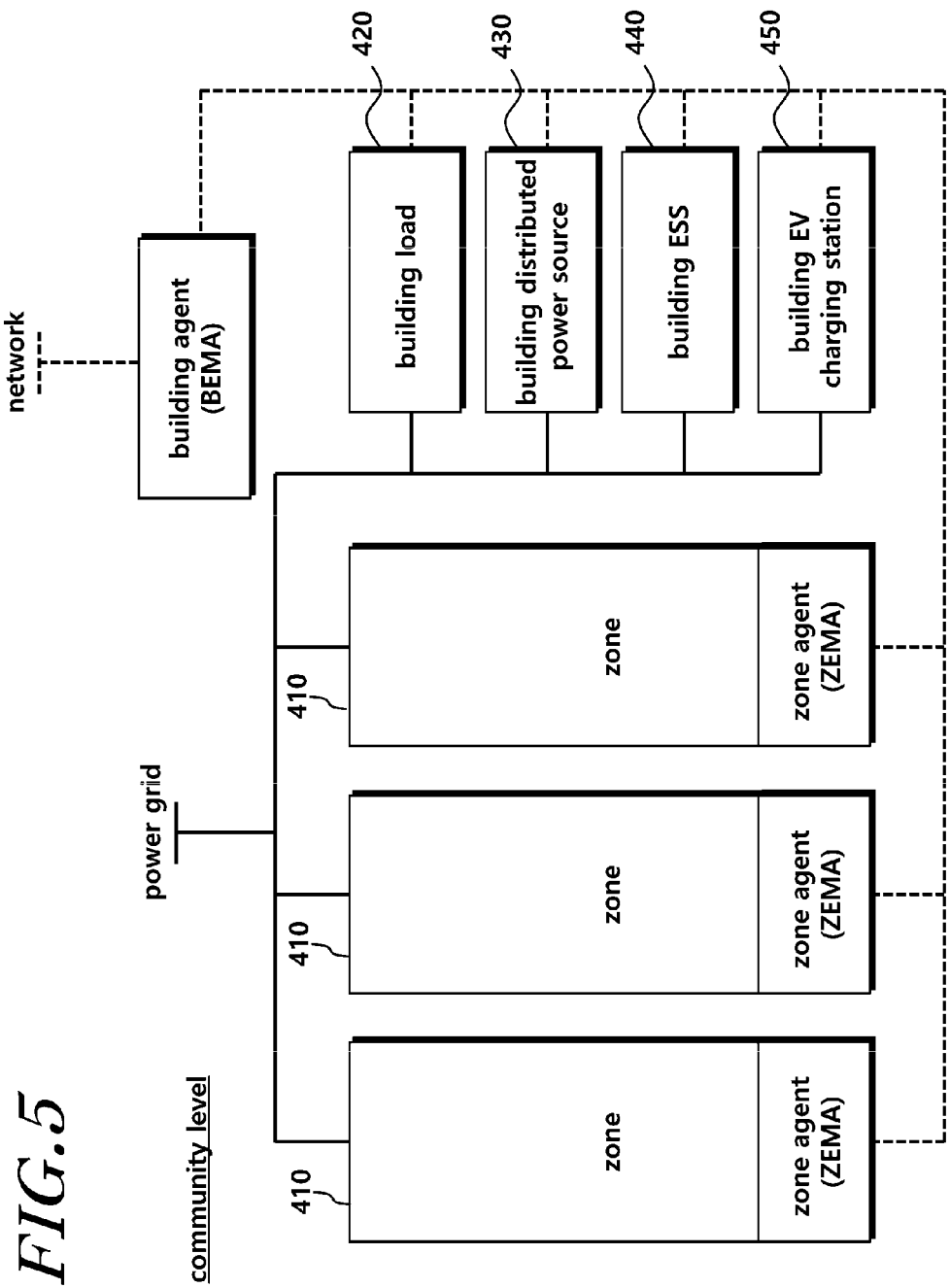
FIG. 5 is a system configuration diagram of a building level.

FIG. 5 is a system configuration diagram of a building level.

Referring to FIG. 5, each building is divided into at least one zone 410.

A person who constructs an energy management system according to an embodiment may divide each building into a plurality of thermal zones. A thermal zone may mean a zone in which a thermal energy device, for example, a cooling and heating device, is independently controlled. Different thermal zones may be controlled to be different thermal states. For example, an indoor temperature may be controlled to be 23 degrees in a first thermal zone, and an indoor temperature may be controlled to be 28 degrees in a second thermal zone.

Building devices not belonging to each zone 410 may be included in a building. For example, the building may include a building load 420 (for example, an elevator load, etc.), a building distributed power source 430, a building ESS 440, a building EV charging station 450, etc.

A building agent (BEMA) that manages energy of the entirety of a building is located in the building. The building agent (BEMA) is connected to a zone agent (ZEMA) located in each zone 410, and controls each zone agent (ZEMA). Also, the building agent (BEMA) is connected to the building devices 420, 430, 440, and 450 which do not belong to the zones, obtains state information of the building devices 420, 430, 440, and 450, and controls the building devices 420, 430, 440, and 450.

Figure 6:
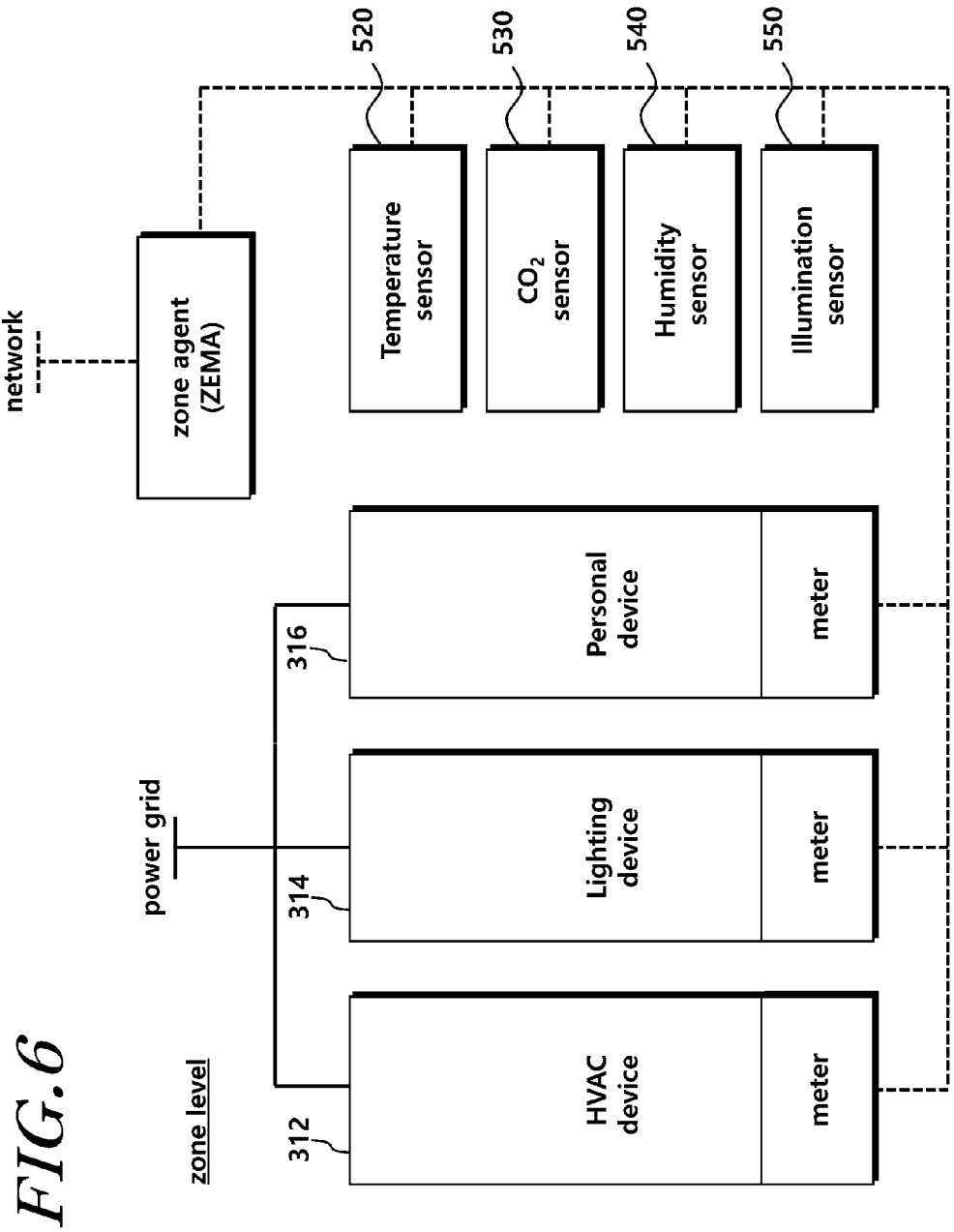
FIG. 6 is a system configuration diagram of a zone level.

FIG. 6 is a system configuration diagram of a zone level.

Referring to FIG. 6, energy devices 312 and 314, and a personal device 316 may be located in each zone.

The personal device 316 is an electrical device reflecting the characteristic of a person. For example, a Personal Computer (PC), a desk stand lamp, etc. belong to the personal device 316. The energy devices 312 and 314 do not correspond to the personal device 316, and is an electrical device that mainly controls the environment of each zone. For example, an HVAC (Heating, Ventilation, and Air Conditioning) device 312 and a lighting device 314 belong to the energy device.

A plurality of sensors are located in each zone, and they may constitute a sensor network. For example, a temperature sensor 520, a $CO_2$ sensor 530, a humidity sensor 540, an illumination sensor 550, etc. may be located in each zone.

A zone agent (ZEMA) that manages energy of the entirety of a zone is located in the zone. The zone agent (ZEMA) may obtain measurement data from the sensors 520, 530, 540, and 550, and may obtain device energy usage data from the energy devices 312 and 314, and the personal device 316.

Agent devices (CEMA, BEMA, and ZEMA) included in the energy management system may utilize machine learning devices in order to increase the accuracy of estimation and optimization. The agent devices (CEMA, BEMA, and ZEMA) may include a relatively simple hardware resource, and the machine learning device may be disposed in a cloud system including abundant calculation resources.

Figure 7:
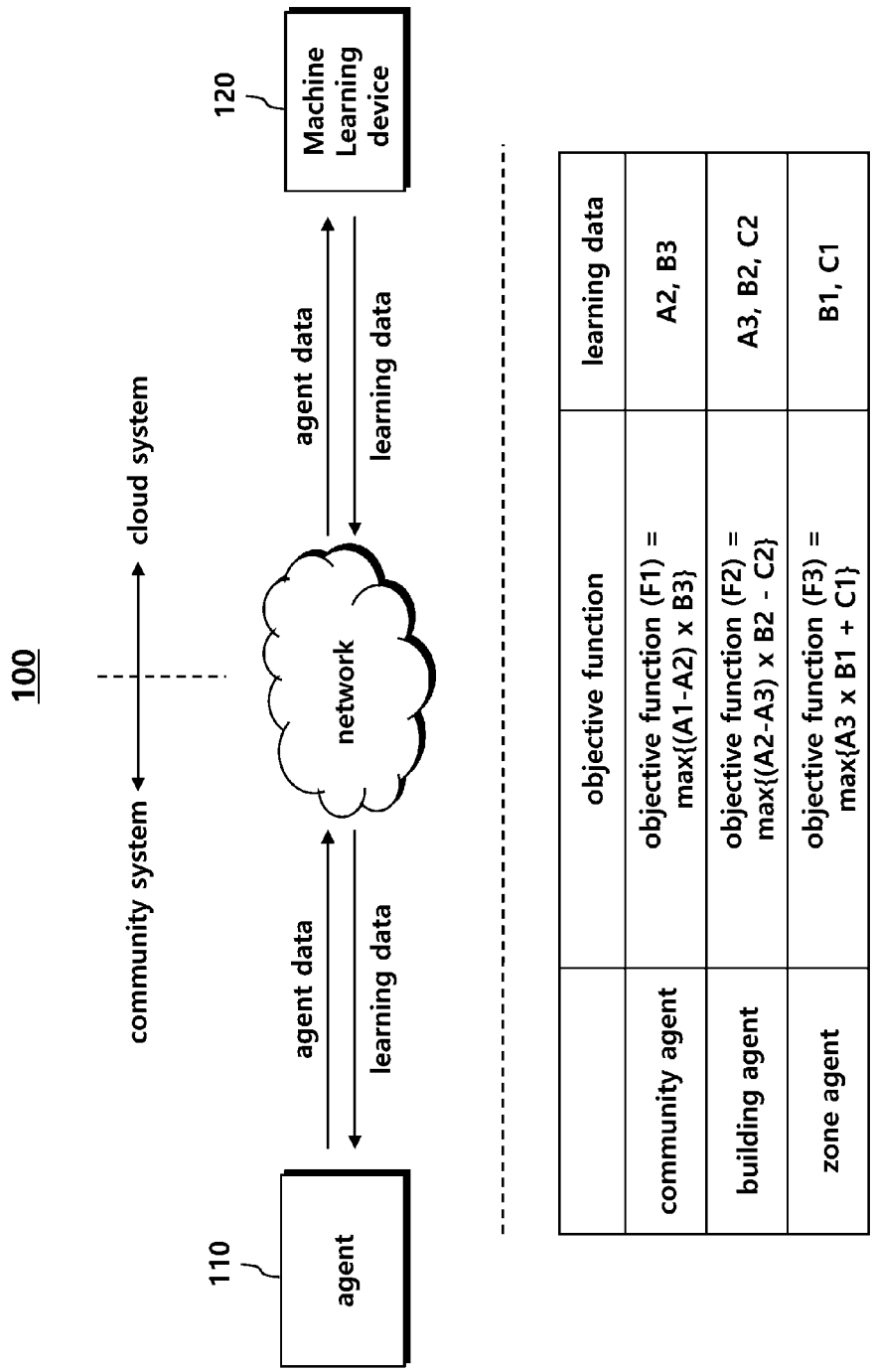
FIG. 7 is a diagram showing a relation between an agent device and a machine learning device and an objective function of each agent device according to an embodiment.

FIG. 7 is a diagram showing a relation between an agent device and a machine learning device and an objective function of each agent device according to an embodiment.

Referring to FIG. 7, an energy management system 100 includes a community system and a cloud system.

The community system includes at least one agent device 110, and the cloud system includes at least one machine learning device 120.

In a community, the agent device 110 may be hierarchically disposed, and the agent device 110 disposed in each hierarchy may transmit and receive information to and from the machine learning device 120 while independently communicating with the machine learning device 120.

The agent device 110 generates measurement data from various sensors and meters located in a space of the community, and then transmits the generated data to the machine learning device 120 through a network. Also, the agent device 110 includes a User Interface (UI) device, and transmits, to the machine learning device 120, configuration information obtained from a user through the UI device. Data transmitted from the agent device 110 to the machine learning device 120 is called agent data and may include the aforementioned measurement data and configuration data.

The machine learning device 120 generates estimation data and optimization data through a machine learning model using, as input data, measurement data and configuration data received from the agent device 110, and then transmits the generated data to the agent device 110.

The agent device 110 manages the energy of the community using the estimation data and optimization data received from the machine learning device 120. Data transmitted from the machine learning device 120 to the agent device 110 is called learning data and learning data may include estimation data and optimization data.

As a specific example, each agent includes an objective function, and may determine a value of a variable included in the objective function through learning data received from the machine learning device 120.

For example, a community agent may receive a second incentive (A2) and a community demand response capacity (B3) from the machine learning device 120 among a first incentive (A1), the second incentive (A2), and the community demand response capacity (B3), which are used as a variable of a first objective function (F1). As another example, a building agent may receive the third incentive (A3), a building demand response capacity (B2), and an equipment investment cost (C2) from the machine learning device 120 among the second incentive (A2), the third incentive (A3), the building demand response capacity (B2), and the equipment investment cost (C2), which are used as a variable of a second objective function (F2). A zone agent may receive a zone demand response capacity (B1) and a user satisfaction degree (C1) from the machine learning device 120 among the third incentive (A3), the zone demand response capacity (B1), and user satisfaction degree (C1), which are used as a variable of a third objective function (F3).

A demand response may be defined by a scheme in which a particular amount is not used among the amount of power which has conventionally been used or is estimated to be used. In a more developed manner, a demand response may be defined to be an amount of energy which is not supplied through a power supplier among a user energy demand amount or energy demand estimation amount. In the latter case, the demand response may include a power supply amount of a battery or distributed power source possessed by itself.

In order to calculate a capacity participating in a demand response, a reference energy demand amount or energy demand estimation amount is required to be decided. An energy management system according to an embodiment may estimate an energy demand amount through a machine learning device.

Figure 8:
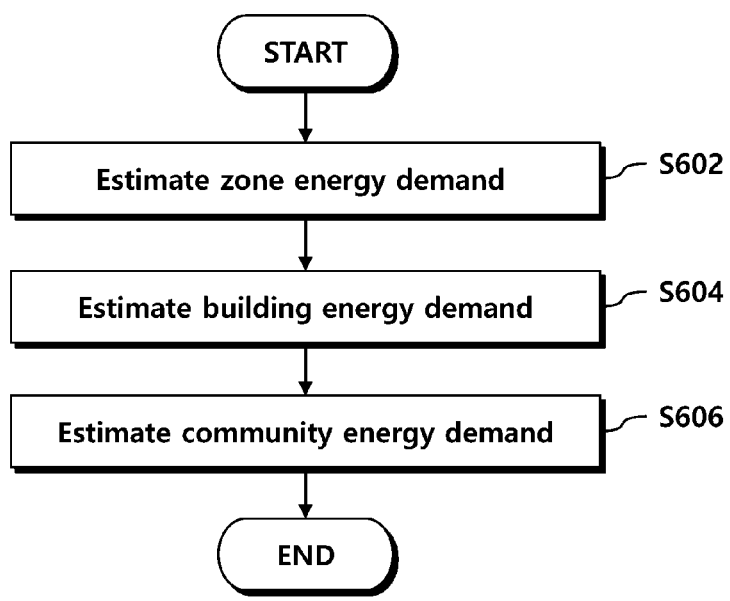
FIG. 8 is a flowchart of an energy demand estimating method according to an embodiment.

FIG. 8 is a flowchart of an energy demand estimating method according to an embodiment.

Referring to FIG. 8, firstly, an energy demand is estimated for each zone (S602).

A zone agent (ZEMA) located in each zone transmits measurement data obtained from a sensor network and device energy usage data obtained from an electrical device to a machine learning device and receives zone energy demand estimation data.

When an energy demand has been estimated for each zone, then an energy demand is estimated for each building (S604).

A building agent (BEMA) located in each building transmits zone energy demand estimation data for each zone and state information of building devices not belonging to the each zone to a machine learning device and receives building energy demand estimation data.

When an energy demand has been estimated for each building, then an energy demand for the entire community is estimated (S606).

A community agent (CEMA) transmits building energy demand estimation data for each building and state information of community devices not belonging to the each building to a machine learning device and receives community energy demand estimation data.

The energy management system may estimate an energy demand for each zone through the hierarchical structure.

An energy demand estimation of a zone agent will be further described.

The zone agent may configure whether to allow each occupant of the zone to participate in a demand response or in a Frequency Regulation (FR).

The zone agent may store separate user configurations for a case (case 1) and a case (case 2), respectively. Then, case 1 indicates a case of not participating in a demand response or a frequency regulation and case 2 indicates a case of participating in a demand response or a frequency regulation. For example, in case 1, the zone agent may store a configuration value of an indoor temperature, and an indoor illuminance. In case 2, the zone agent may store a configuration range of an indoor temperature and a configuration range of an indoor illuminance.

The zone agent may store a user configuration for case to be a particular value, and may store a user configuration for case 2 to be a range. For example, the zone agent may store a value of an indoor temperature a user wants, and an indoor illuminance a user wants, for case 1. During the participation in a demand response or a frequency regulation in case 2, the zone agent may store a range of an indoor temperature and a range of an indoor luminance in which a user can maintain their own convenience at a particular degree.

With respect to case 2, the zone agent may quantify a user satisfaction degree for each detail section in a user configuration range and store the quantified value. For example, when a user configuration range about an indoor temperature is from 24 degrees Celsius to 28 degrees Celsius, the zone agent may configure a user satisfaction degree of 10 at 24 to 25 degrees Celsius, a user satisfaction degree of 8 at 25 to 26 degrees Celsius, a user satisfaction degree of 6 at 26 to 27 degrees Celsius, and a user satisfaction degree of 4 at 27 to 28 degrees Celsius.

The zone agent may generate zone energy demand data through machine learning using some or the entirety among data (zone data) generated from a zone. Zone data may include measurement data generated from a sensor network and configuration data including information relating to a user configuration, and may include physical data including physical information (for example, area, windows and doors, heat insulation, etc.) of a zone and weather data, etc. as external data.

An energy demand amount in a zone may be greatly affected by the number of users existing in the corresponding zone and the characteristic of the user. Accordingly, the zone agent may estimate occupants in a zone using machine learning and may generate zone energy demand estimation amount on the basis of the estimated occupants.

Figure 9:
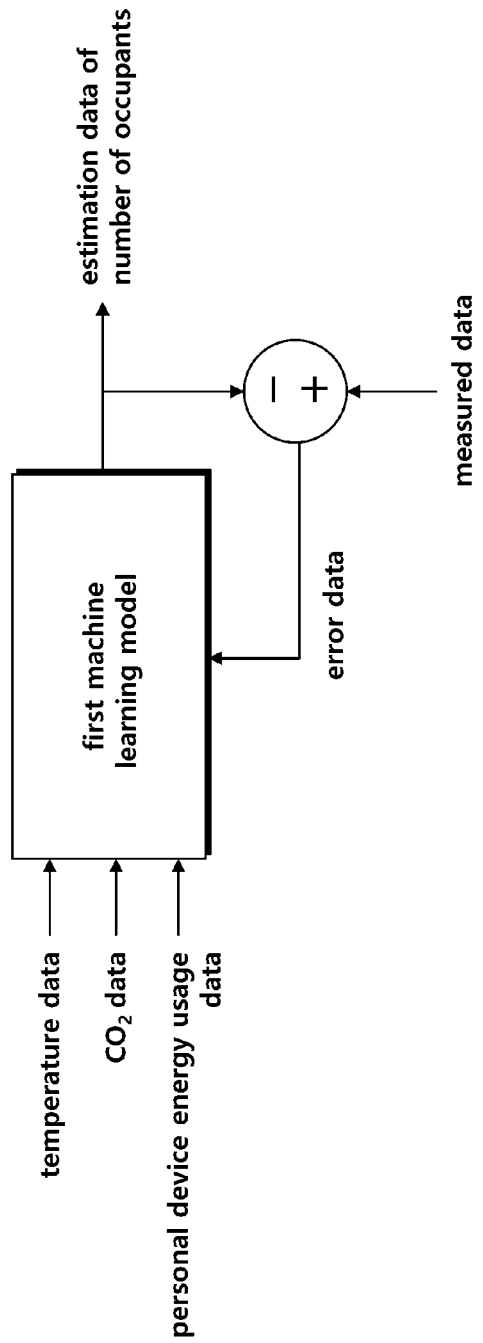
FIG. 9 is a configuration diagram of a first machine learning model for estimating the number of occupants.
Figure 10:
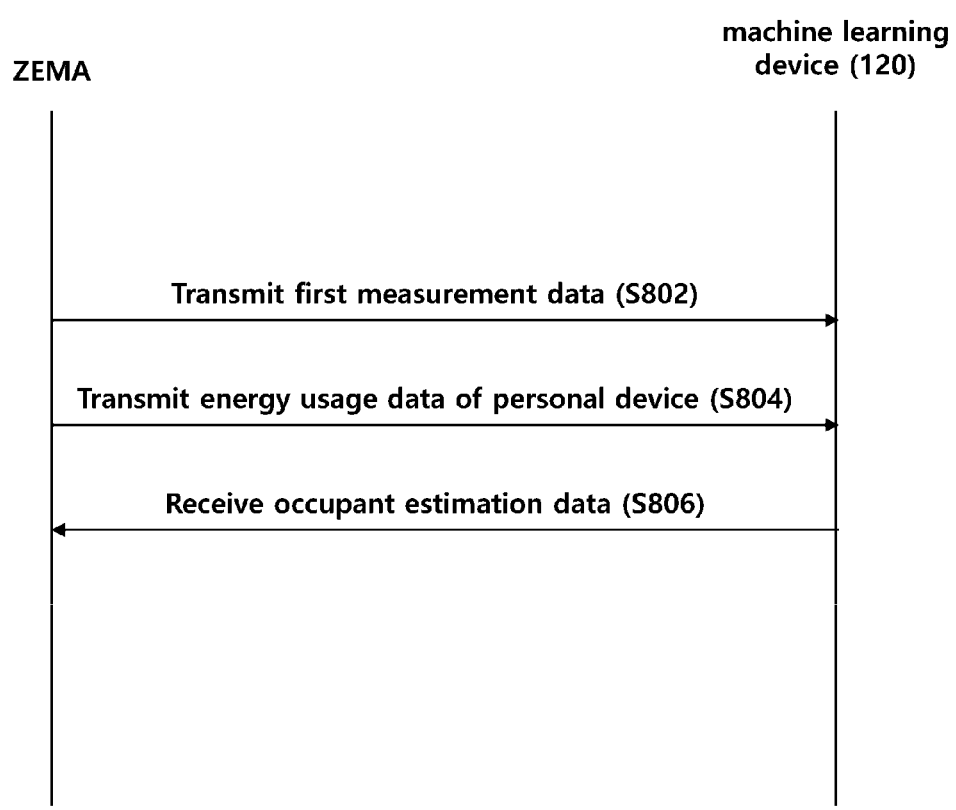
FIG. 10 is a signal flow diagram of a method for estimating the number of occupants for each zone.

FIG. 9 is a configuration diagram of a first machine learning model for estimating the number of occupants, and FIG. 10 is a signal flow diagram of a method for estimating the number of occupants for each zone.

The energy management system may estimate the number of occupants for each zone before estimating an energy demand for the zone. The energy management system first estimates the number of occupants and thus can increase user convenience of residents in each zone and properly maintain energy efficiency.

Referring to FIG. 9, a first machine learning model for estimation of the number of occupants may include, as input data, temperature data, CO2 data, and personal device energy usage data. All of temperature data, CO2 data, and personal device energy usage data are variables relating to occupants. For example, when the number of occupants for each zone is increased, the CO2 concentration increases. The first machine learning model may learn a relation between the CO2 concentration and the number of occupants and when CO2 data is input in an estimation stage, may estimate the number of occupants through the input data. Also, personal device energy usage data may have a close correlation with the number of occupants. For example, when a PC is in a state of a high energy usage, a person who manages the PC may be in the corresponding zone. The first machine learning model may learn a relation between personal device energy usage data and the number of occupants and when personal device energy usage data is input in an estimation stage, may estimate the number of occupants through the input data.

The first machine learning model may further use, as input data, illuminance data or wireless communication (for example, Bluetooth, Wi-Fi, etc. which are a short range communication) data with a user terminal. In order to generate wireless communication data, a wireless communication device, for example, a Bluetooth device, may be disposed in each zone. The wireless communication device may determine whether a user is located inside, through wireless communication with a user terminal, for example, a mobile phone, and may generate, as wireless communication data, a result obtained by the determination.

The first machine learning model may use, as input data, all of temperature data, CO2 data, and personal device energy usage data. However, only a part of the pieces of data may be used as input data, depending on embodiments. For example, the first machine learning model may use CO2 data as input data to calculate the number of occupants. Depending on embodiments, temperature data and device energy usage data on a personal device may be further included as input data.

The first machine learning model may compare estimation data and measured data of the number of occupants to generate error data, and may change a parameter and a structure in the first machine learning model so as to reduce an error value from the error data. A sensor that measures the number of occupants may not be included in each zone. In this case, in order to secure measured data, the first machine learning model may utilize another information. For example, a zone agent (ZEMA) may include a UI device. The UI device allows the number of occupants to be input irregularly, and the user input information may be utilized as measured data of the first machine learning model.

The first machine learning model may generate an occupant pattern as well as the number of occupants. An occupant pattern may be a value which indicates whether a user exists in the zone, according to the passage of time. The first machine learning model may generate the occupant pattern. The machine learning device may generate occupant estimation information including the number of occupants and an occupant pattern through the first machine learning model, and may generate zone energy demand estimation data using the occupant estimation information. Hereinafter, the number of occupants which is an example of occupant estimation information will be described. However, an occupant pattern, etc. may be used as another example.

Referring to FIG. 10, the zone agent (ZEMA) transmits first measurement data to the machine learning device 120 (S802). The first measurement data is measurement data having a high degree of association with the number of occupants among pieces of measurement data obtained from a sensor network installed in each zone. For example, temperature data and CO2 data may correspond to the first measurement data.

The zone agent (ZEMA) transmits energy usage data about a personal device to the machine learning device 120 (S804).

The machine learning device 120 calculates the number of occupants for each zone through the first machine learning model including, as input data, the first measurement data and the energy usage data about a personal device, generates occupant estimation data, and then transmits the generated data to the zone agent (ZEMA) (S806).

When the number of occupants has been estimated, then zone energy demand estimation data is generated.

Figure 11:
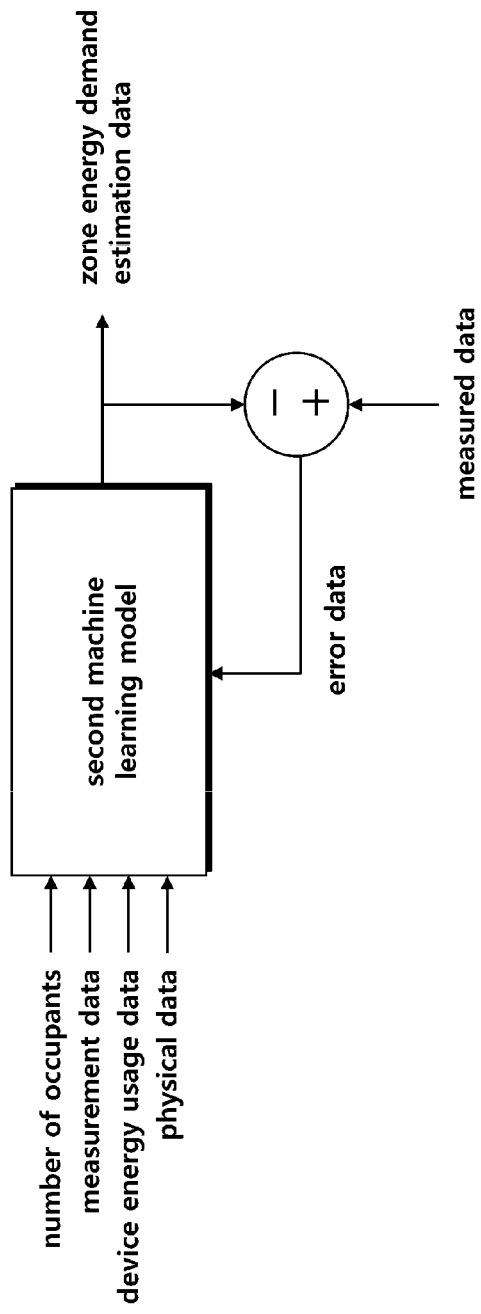
FIG. 11 is a configuration diagram of a second machine learning model for energy demand estimation for each zone.
Figure 12:
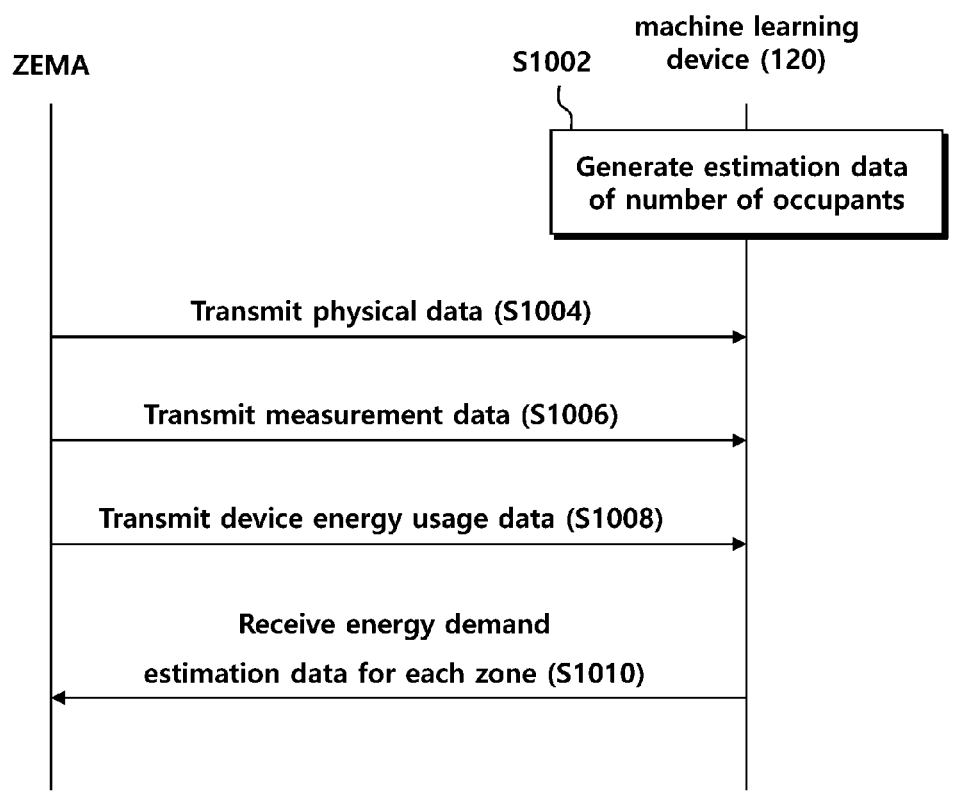
FIG. 12 is a signal flow diagram of a method for estimating an energy demand for each zone.

FIG. 11 is a configuration diagram of a second machine learning model for energy demand estimation for each zone, and FIG. 12 is a signal flow diagram of a method for estimating an energy demand for each zone.

Referring to FIG. 11, a second machine learning model for energy demand estimation for each zone may include, as input data, the number of occupants, measurement data, device energy usage data of an electrical device (an energy device and a personal device), and physical data about each zone. The physical data about each zone may include location information of each zone, area information of each zone, window and door information of each zone, and external wall information of each zone. The device energy usage data may include real time energy usage and energy use pattern information. The measurement data may include temperature data, humidity data, luminance data, CO2 data, etc.

The second machine learning model may learn a relation between input data and zone energy usage and when input data is input in an estimation stage, may generate zone energy demand estimation data.

The second machine learning model may compare zone energy demand estimation data and measured data to generate error data, and may change a parameter and a structure in the second machine learning model so as to reduce an error value from the error data. Then, the measured data may be obtained through device energy usage data.

Referring to FIG. 12, the machine learning device 120 may estimate the number of occupants and may generate estimation data of the number of occupants, as described above with reference to FIGS. 9 and 10 (S1002).

The zone agent (ZEMA) manages physical data about the zone, and periodically or aperiodically transmits physical data to the machine learning device 120 (S1004).

Then, the zone agent (ZEMA) transmits measurement data (S1006), and transmits device energy usage data about an electrical device (S1008).

The machine learning device 120 generates zone energy demand estimation data for each zone through the second machine learning model including, as input data, the number of occupants, measurement data, device energy usage data, and physical data, and then may transmit the generated data to the zone agent (ZEMA) (S1010).

The zone agent (ZEMA) manages energy for each zone using zone energy demand estimation data received for each zone.

Physical data about each zone may further include location information of each zone. The machine learning device may further obtain external air data about a location of each zone from the zone agent (ZEMA) or another device, for example, a weather server, and may further include, as input data, the external air data in the second machine learning to generate zone energy demand estimation data.

The zone agent (ZEMA) stores measurement device, device energy usage data, and physical data in a local Database (DB), and may periodically transmit data stored in the local DB to a cloud DB linked with the machine learning device 120. The machine learning device 120 may utilize data stored in the cloud DB to generate the number of occupants or zone energy demand estimation data.

When energy demand estimation for each zone has been completed, the energy management system may gather the completed energy demand estimation for each zone and then may perform energy demand estimation for a building.

Figure 13:
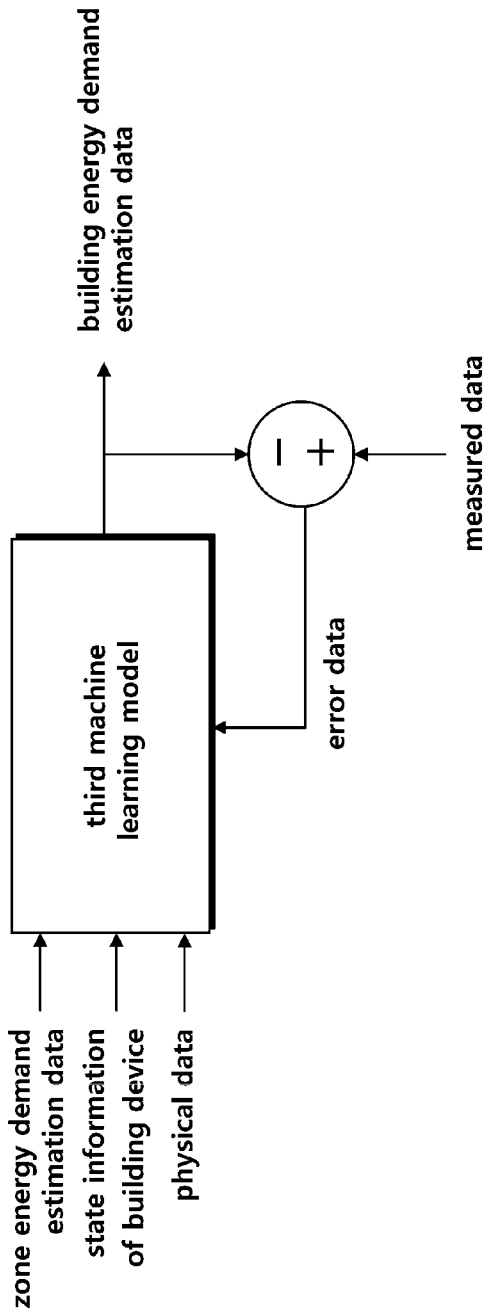
FIG. 13 is a configuration diagram of a third machine learning model for energy demand estimation for each building.
Figure 14:
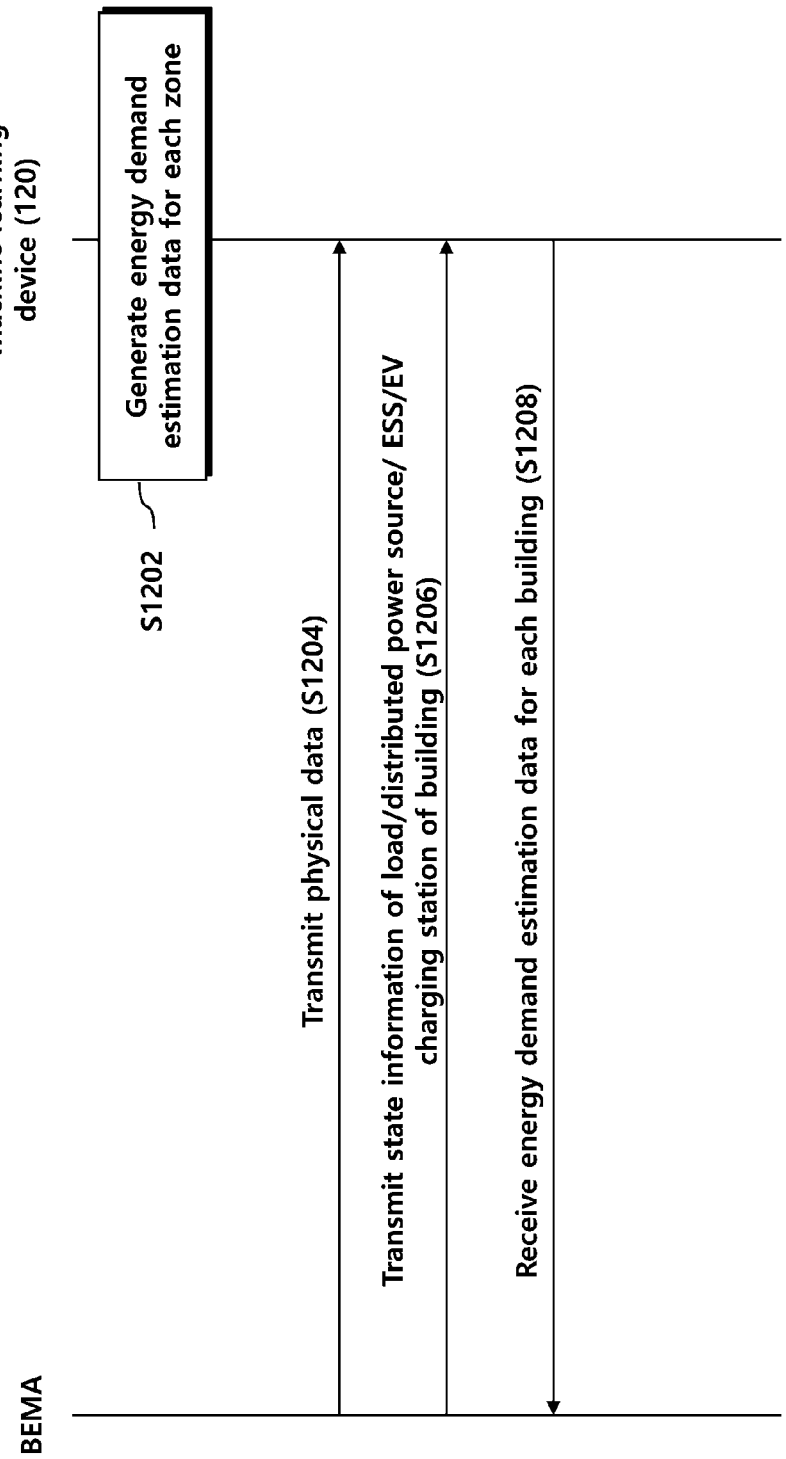
FIG. 14 is a signal flow diagram of a method for estimating an energy demand for each building.

FIG. 13 is a configuration diagram of a third machine learning model for energy demand estimation for each building, and FIG. 14 is a signal flow diagram of a method for estimating an energy demand for each building.

Referring to FIG. 13, the third machine learning model for energy demand estimation for each building may include, as input data, zone energy demand estimation data, state information of a building device, and physical data of a building. Physical data of a building may include location information of each building, area information of each building, window and door information of each building, and external wall information of each building, etc. State information of a building device may include, for example, information of an amount of power generation of a building distributed power source, a charge amount of a building ESS, an amount of power supplied to an electric car connected to a building EV charging station, etc.

The third machine learning model may learn a relation between input data and building energy usage and when input data is input in an estimation stage, may generate building energy demand estimation data.

The third machine learning model may compare building energy demand estimation data and measured data to generate error data, and may change a parameter and a structure in the third machine learning model so as to reduce an error value from the error data. Then, the measured data may be obtained through energy usage data of each zone and energy usage data or energy supply amount data of a building device.

Referring to FIG. 14, the machine learning device 120 generates energy demand estimation data for each zone (S1202).

The building agent (BEMA) manages physical data about the building, and periodically or aperiodically transmits physical data to the machine learning device 120 (S1204).

Then, the building agent (BEMA) obtains state information of at least one building device among a building load, a building distributed power source, a building ESS, and a building EV charging station, and transmits the obtained information to the machine learning device 120 (S1206).

Then, the machine learning device 120 may generate building energy demand estimation data through the third machine learning model including, as a input data, zone energy demand estimation data for each zone with respect to each building, state information of a building device, and physical data about each building, and may transmit the generated data to the building agent (BEMA) (S1208).

When energy demand estimation for each building has been completed, the energy management system may gather the completed energy demand estimation for each building and then may perform energy demand estimation for a community.

Figure 15:
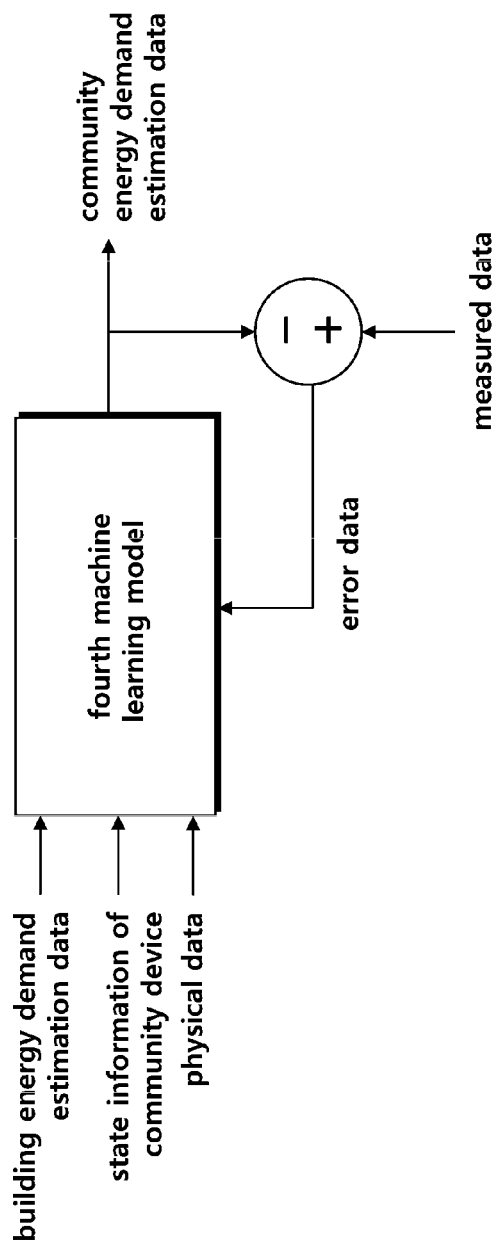
FIG. 15 is a configuration diagram of a fourth machine learning model for community energy demand estimation.
Figure 16:
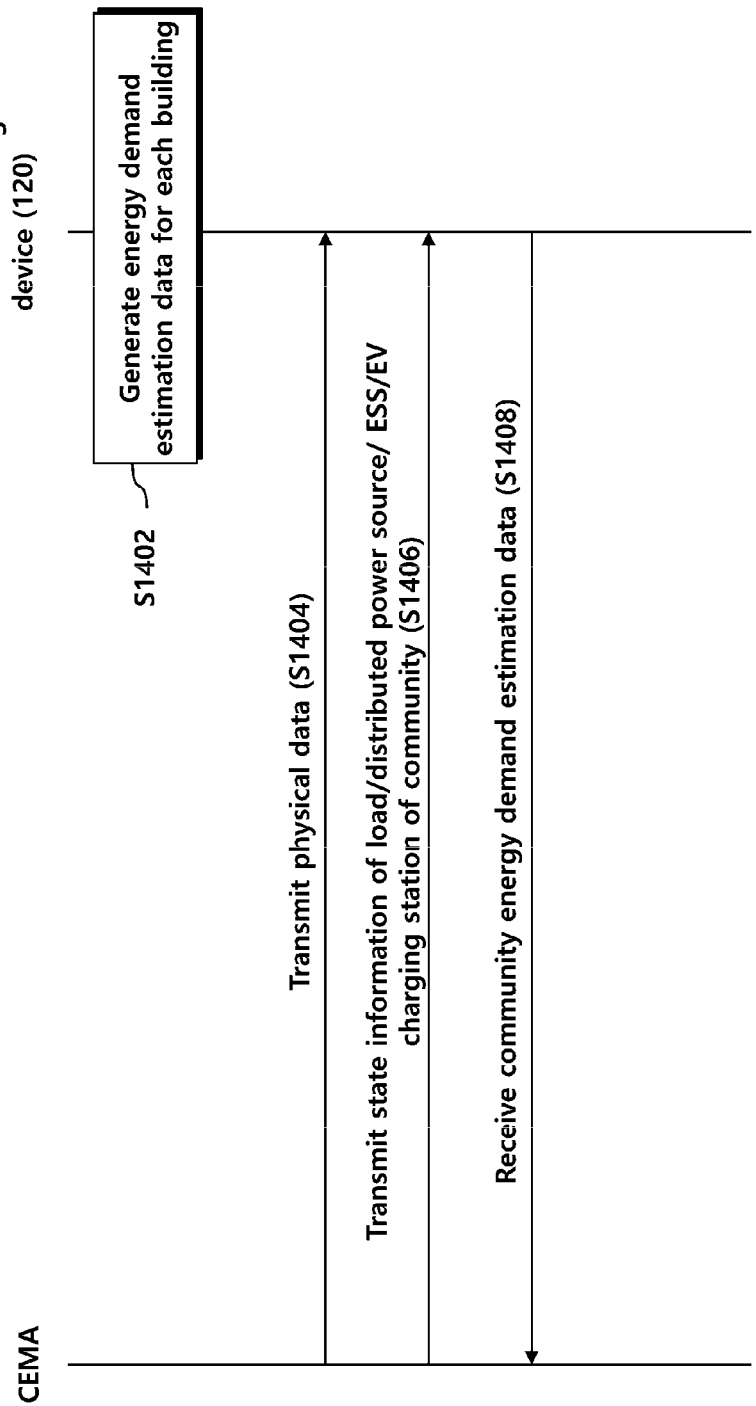
FIG. 16 is a signal flow diagram of a method for estimating a community energy demand.

FIG. 15 is a configuration diagram of a fourth machine learning model for community energy demand estimation, and FIG. 16 is a signal flow diagram of a method for estimating a community energy demand.

Referring to FIG. 15, the fourth machine learning model for community energy demand estimation may include, as input data, building energy demand estimation data, state information of a community device, and physical data of a community. Physical data of a community may include location information of the community, etc. State information of a community device may include, for example, information of an amount of power generation of a community distributed power source, a charge amount of a community ESS, an amount of power supplied to an electric car connected to a community EV charging station, etc.

The fourth machine learning model may learn a relation between input data and community energy usage and when input data is input in an estimation stage, may generate community energy demand estimation data.

The fourth machine learning model may compare community energy demand estimation data and measured data to generate error data, and may change a parameter and a structure in the fourth machine learning model so as to reduce an error value from the error data. Then, the measured data may be obtained through energy usage data of each building and energy usage data or energy supply amount data of a community device.

Referring to FIG. 16, the machine learning device 120 generates energy demand estimation data for each building (S1402).

The community agent (CEMA) manages physical data about the community, and periodically or aperiodically transmits physical data to the machine learning device 120 (S1404).

Then, the community agent (CEMA) obtains state information of at least one community device among a community load, a community distributed power source, a community ESS, and a community EV charging station, and transmits the obtained information to the machine learning device 120 (S1406).

Then, the machine learning device 120 may generate community energy demand estimation data through the fourth machine learning model including, as a input data, building energy demand estimation data for each building, state information of a community device, and physical data about the community, and may transmit the generated data to the community agent (CEMA) (S1408).

An energy management system according to an embodiment may estimate a response capacity to participate in a demand response or a frequency regulation, as well as may estimate an energy demand amount.

Figure 17:
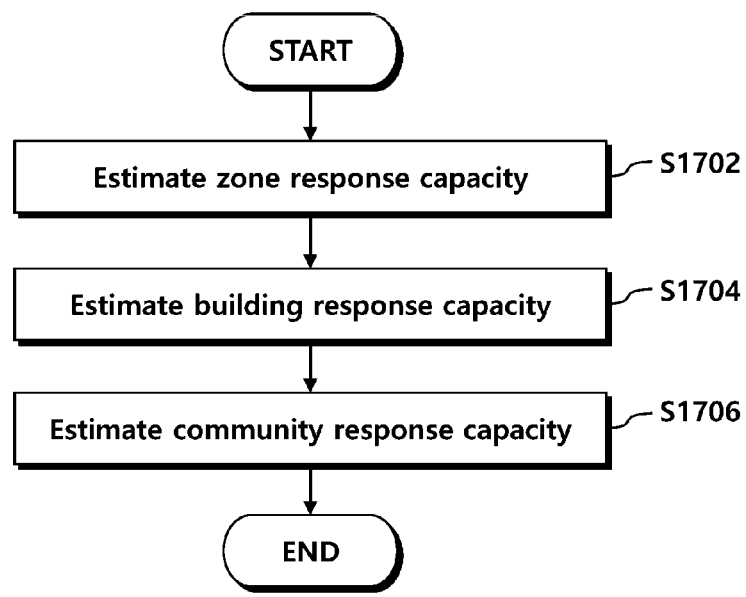
FIG. 17 is a flowchart of response capacity estimation of an energy management system according to an embodiment.

FIG. 17 is a flowchart of response capacity estimation of an energy management system according to an embodiment.

Referring to FIG. 17, an energy management system may: estimate a zone response capacity to participate in a demand response or a frequency regulation in each zone (S1702); gather zone response capacity about each zone and sum up a response capacity to participate in a demand response or a frequency regulation among a building management capacity not belonging to each zone, to estimate a building response capacity (S1704); and gather a building response capacity of each building and sum up a response capacity to participate in a demand response or a frequency regulation among a community management capacity not belonging to each building to estimate a community response capacity (S1706).

Figure 18:
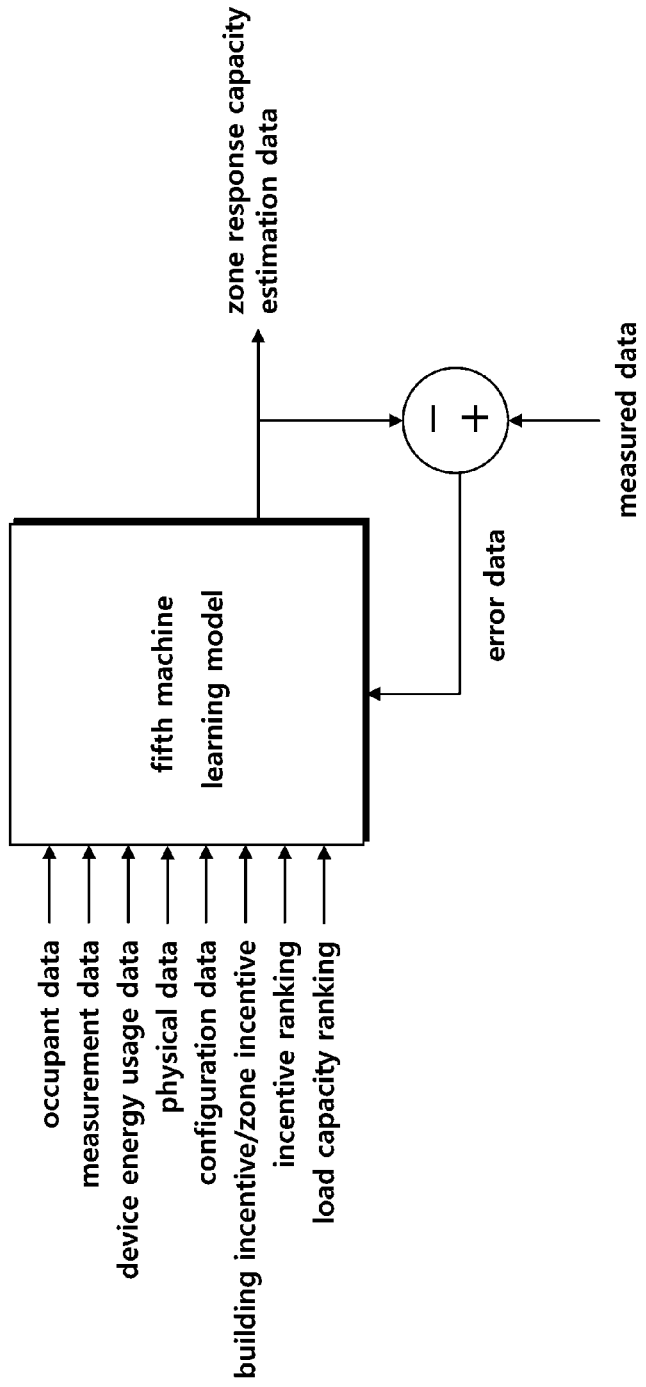
FIG. 18 is a configuration diagram of a fifth machine learning model for response capacity estimation of a zone.

FIG. 18 is a configuration diagram of a fifth machine learning model for response capacity estimation of a zone.

Referring to FIG. 18, a fifth machine learning model for response capacity estimation of a zone may include, as input data, at least one among occupant data, measurement data, device energy usage data, physical data, configuration data, an building incentive/zone incentive, an incentive ranking, and a load capacity ranking, and consequently, may generate zone response capacity estimation data.

The fifth machine learning model may learn a relation between input data and a zone response capacity and when input data is input in an estimation stage, may generate zone response capacity estimation data.

The fifth machine learning model may compare zone response capacity estimation data and measured data to generate error data, and may change a parameter and a structure in the fifth machine learning model so as to reduce an error value from the error data.

The fifth machine learning model may estimate a zone response capacity to increase a degree of satisfaction of a user according to a user satisfaction degree in each detail section and a user configuration range included in configuration data, and may also consider a profit in response to an incentive together with the user satisfaction degree to estimate zone response capacity.

The fifth machine learning model may generate zone response capacity estimation data to allow an agent of a corresponding zone to compete with an agent of another zone and a building agent. For example, the fifth machine learning model may compare a building incentive applied to a building agent with a zone incentive applied to a corresponding zone agent to determine a zone response capacity. When the zone incentive is relatively lower than the building incentive, the fifth machine learning model may compete with the building agent to lower a zone response capacity so as to increase a future zone incentive. In another example, the fifth machine learning model may include, as input data, a load capacity ranking and an incentive ranking of a zone corresponding to a zone agent among all the zones of a building, and may determine a zone response capacity on the basis of the included ranking. When an incentive ranking of a zone is low compared with a load capacity ranking thereof, the fifth machine learning model reduces a zone response capacity. When an incentive ranking of a zone is high compared with a load capacity ranking thereof, the fifth machine learning model increases a zone response capacity. Through this scheme, the fifth machine learning model may determine a zone response capacity. Each zone agent independently executes the fifth machine learning model. Accordingly, each zone agent does not recognize zone incentives about zones different from each other, and may compete in view of the aforementioned load capacity ranking and incentive ranking.

Figure 19:
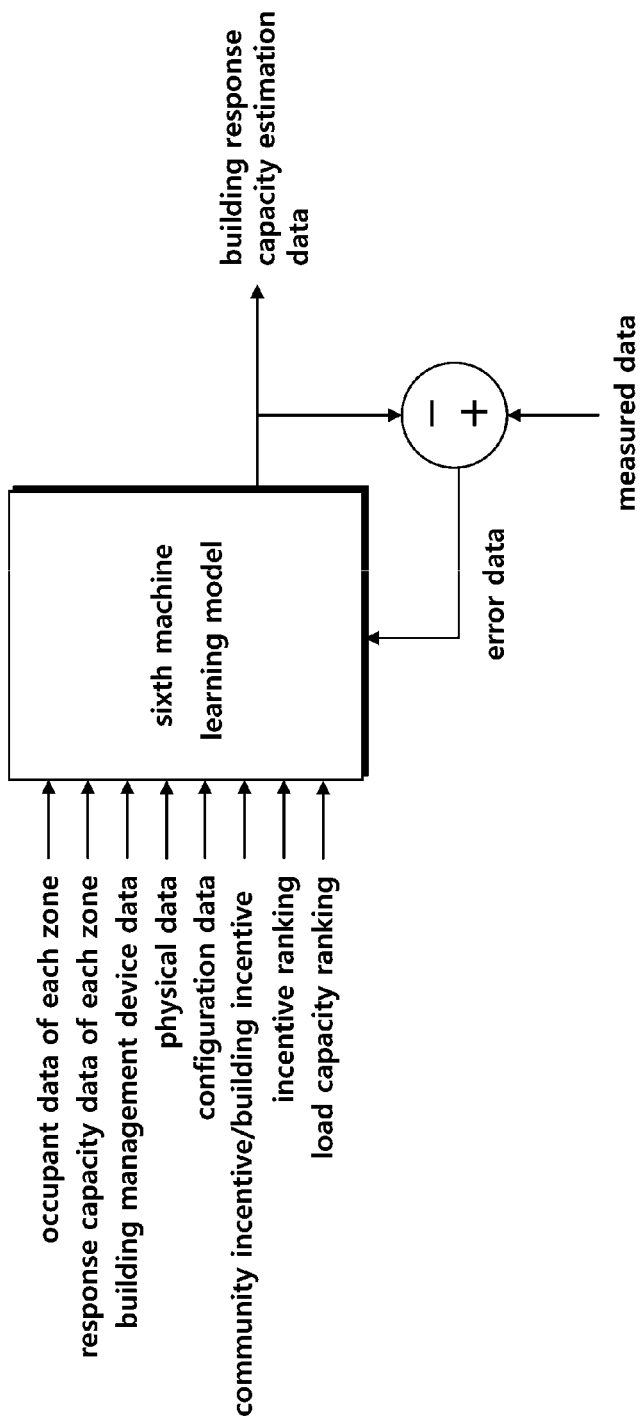
FIG. 19 is a configuration diagram of a sixth machine learning model for response capacity estimation of a building.

FIG. 19 is a configuration diagram of a sixth machine learning model for response capacity estimation of a building.

Referring to FIG. 19, a sixth machine learning model for response capacity estimation of a building may include, as input data, at least one among occupant data of each zone, response capacity data of each zone, building management device data, physical data, configuration data, a community incentive, a building incentive, an incentive ranking, and a load capacity ranking, and consequently, may generate building response capacity estimation data.

The sixth machine learning model may learn a relation between input data and a building response capacity and when input data is input in an estimation stage, may generate building response capacity estimation data.

The sixth machine learning model may compare building response capacity estimation data and measured data to generate error data, and may change a parameter and a structure in the sixth machine learning model so as to reduce an error value from the error data.

A building agent or the sixth machine learning model may gather occupant data for each zone, for example, the number of occupants, to generate occupant information of a building and may utilize the generated information in machine learning.

A building agent or the sixth machine learning model may gather response capacity data for each zone, for example, a zone response capacity, to generate a response capacity of a zone and may utilize the generated response capacity in machine learning.

The sixth machine learning model may include, as input data, information about a building management device, for example, a solar photovoltaic power generator, an Energy Storage System (ESS), a building common load, etc., which is managed by a building agent. For example, the sixth machine learning model may include, as input data, a power generation capacity or an estimated amount of power generation of a solar photovoltaic power generator, and may include, as input data, a State of Charge (SoC) of an ESS and a variable range of an ESS. A variable range of an ESS may be included in the configuration data.

The sixth machine learning model may estimate a building response capacity so as to increase a profit in response to an incentive and reduce an investment cost of equipment, for example, a transformer, an ESS, etc., installed in a building.

The sixth machine learning model may generate building response capacity estimation data to allow a corresponding building agent to compete with another building agent and a community agent. For example, the sixth machine learning model may compare a community incentive applied to a community agent with a building incentive applied to a corresponding building agent to determine a building response capacity. When the building incentive is relatively lower than the community incentive, the sixth machine learning model may compete with the community agent by lowering a building response capacity to increase a future building incentive. In another example, the sixth machine learning model may include, as input data, a load capacity ranking and an incentive ranking of a building corresponding to a building agent among all the buildings of a community, and may determine a building response capacity on the basis of the included ranking. When an incentive ranking of a building is low compared with a load capacity ranking thereof, the sixth machine learning model reduces a building response capacity. When an incentive ranking of a building is high compared with a load capacity ranking thereof, the sixth machine learning model increases a building response capacity. Through this scheme, the sixth machine learning model may determine a building response capacity. Each building agent independently executes the sixth machine learning model. Accordingly, each building agent does not recognize building incentives about buildings different from each other, and may compete in view of the aforementioned load capacity ranking and incentive ranking.

Figure 20:
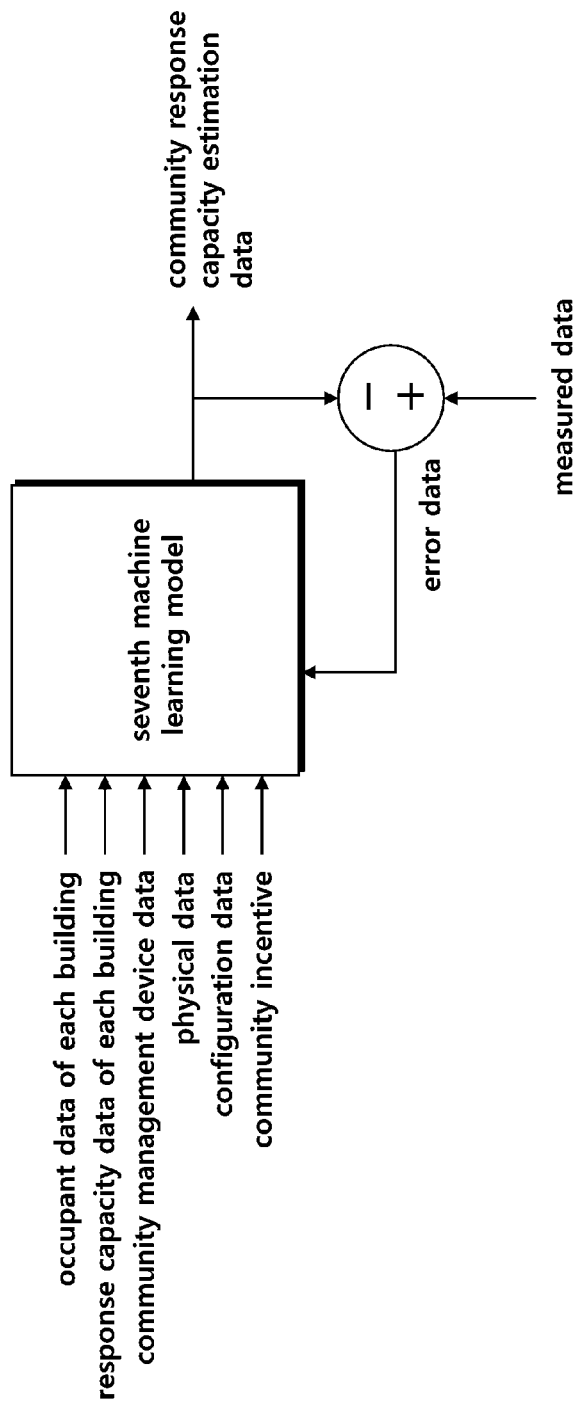
FIG. 20 is a configuration diagram of a seventh machine learning model for community response capacity estimation.

FIG. 20 is a configuration diagram of a seventh machine learning model for community response capacity estimation.

Referring to FIG. 20, a seventh machine learning model for community response capacity estimation may include, as input data, at least one among occupant data of each building, response capacity data of each building, community management device data, physical data, configuration data, and a community incentive, and consequently, may generate community response capacity estimation data.

The seventh machine learning model may compare community response capacity estimation data and measured data to generate error data, and may change a parameter and a structure in the seventh machine learning model so as to reduce an error value from the error data.

A community agent or the seventh machine learning model may gather occupant data for each building, for example, the number of occupants, to generate community occupant information and may utilize the generated information in machine learning.

A community agent or the seventh machine learning model may gather response capacity data for each building, for example, a building response capacity, to generate a response capacity of a building and may utilize the generated response capacity in machine learning.

The seventh machine learning model may include, as input data, information about a community management device, for example, a solar photovoltaic power generator, an Energy Storage System (ESS), a community common load, etc., which is managed by a community agent. For example, the seventh machine learning model may include, as input data, a power generation capacity or an estimated amount of power generation of a solar photovoltaic power generator, and may include, as input data, a State of Charge (SoC) of an ESS and a variable range of an ESS. A variable range of an ESS may be included in the configuration data.

Community response capacity estimation data calculated by the seventh machine learning model is basically based on response capacity data received from a building agent of each building. However, on the contrary, response capacity data transmitted by each building agent is based on a building incentive determined and then transmitted by a community agent. A flow of an energy management method from the reception of a community incentive to the transmission of a community response capacity will be described with reference to FIG. 21.

Figure 21:
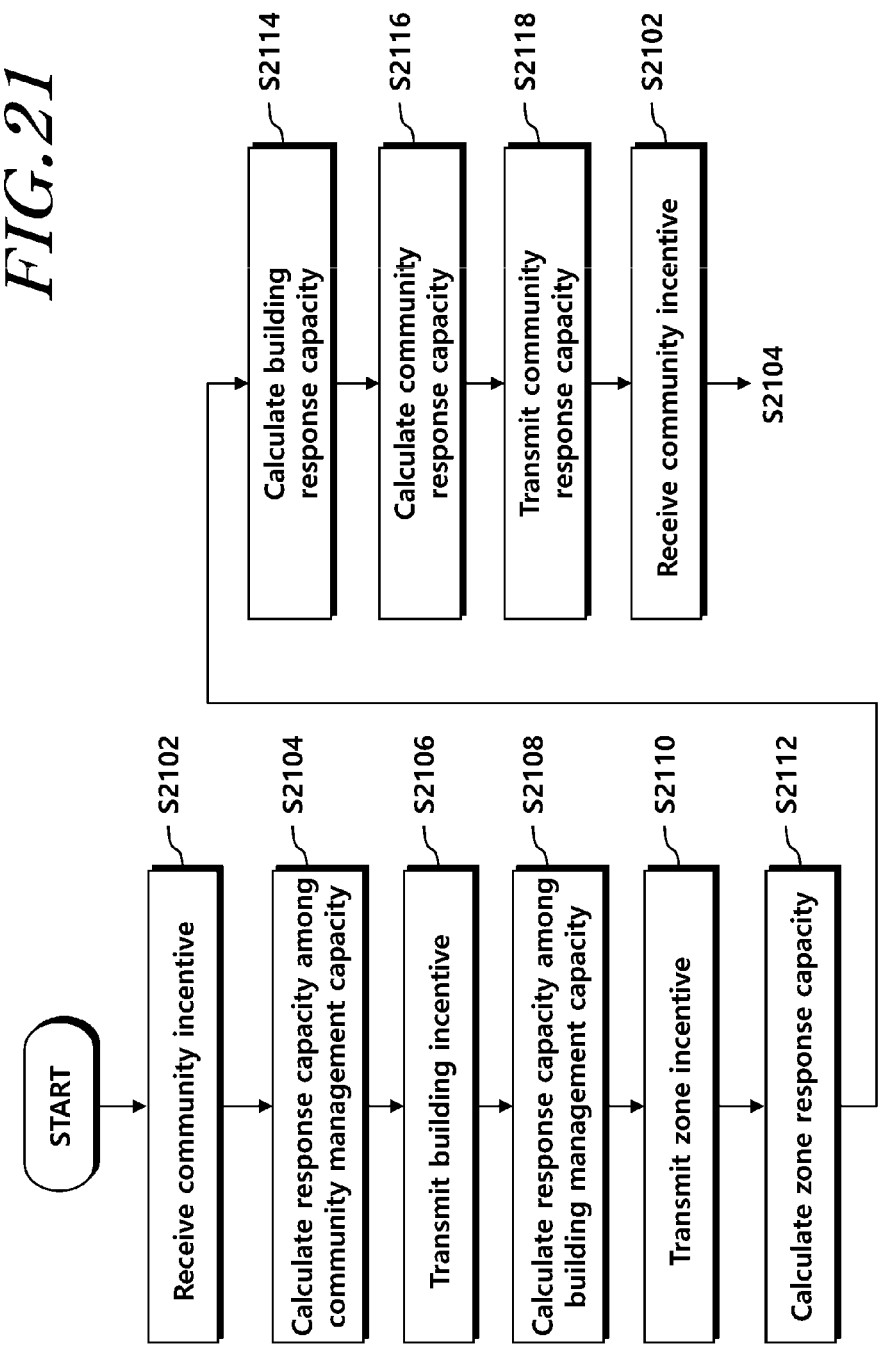
FIG. 21 is a flowchart of a method for receiving a community incentive and transmitting a community response capacity by an energy management system according to an embodiment.

FIG. 21 is a flowchart of a method for receiving a community incentive and transmitting a community response capacity by an energy management system according to an embodiment.

Referring to FIG. 21, a community agent may receive an incentive (a community incentive) about a demand response or a frequency regulation from a demand management device (S2102).

The community agent may calculate a response capacity responding to a community incentive among a community management capacity through machine learning including, as input data, the community incentive (S2104), and calculate a building incentive to be transmitted to a building agent. Then, the community agent may transmit the calculated building incentive to each building agent (S2106).

The building agent may calculate a response capacity responding to a building incentive among a building management capacity through machine learning including, as input data, the received building incentive (S2108), and calculate a zone incentive to be transmitted to a zone agent. Then, the building agent may transmit the calculated zone incentive to each zone agent (S2110).

The zone agent may calculate a response capacity responding to a zone incentive among a zone management capacity through machine learning including, as input data, the received zone incentive (S2112), and transmit the calculated zone response capacity to a building agent.

The building agent may gather a zone response capacity received from each zone agent and adds up a response capacity responding to an incentive among a building management capacity to calculate a building response capacity (S2114).

The community agent may gather a building response capacity received from each building agent and add up a response capacity responding to an incentive among a community management capacity to calculate a community response capacity (S2116).

The community response capacity may be transmitted to the demand management device (S2118) to be used as a bid content for a community incentive.

This procedure may be repeated by receiving a community incentive by the community agent again and then updating the previous value.

In this procedure, the community agent may determine a building incentive to maximize an incentive profit determined by a difference between a community incentive and a building incentive and a building response capacity. Substantially, a building response capacity may be indirectly controlled by a building incentive determined by a community agent.

A zone agent may determine a zone response capacity to maximize an objective function including an incentive profit and a user satisfaction degree. Then, the incentive profit is determined by a zone incentive and a zone response capacity, and the user satisfaction degree is a quantified value, when the zone response capacity is increased, the user satisfaction degree tends to be reduced, and when the zone response capacity is reduced, the user satisfaction degree tends to be increased.

A community management capacity is an energy capacity directly managed by a community agent, and may include a community load capacity and a community distributed power source capacity. A community management capacity may include an estimated amount of power generation of a solar photovoltaic power generator and a dischargeable capacity of an ESS, which are directly managed by a community agent.

A community agent may calculate a response capacity responding to a community incentive among a community common load capacity through machine learning including, as input data, occupant information of a community.

A zone agent may generate occupant information of a zone through machine learning including, as input data, a part among pieces of data generated in the zone. A community agent may gather occupant information of each zone to generate occupant information of a community.

After the aforementioned procedure has proceeded, the energy management system may be operated while being optimized in response to a signal due to a demand response or a frequency regulation.

The energy management system may use energy demand estimation data to generate an optimal control scenario and an energy management policy for each level.

Figure 22:
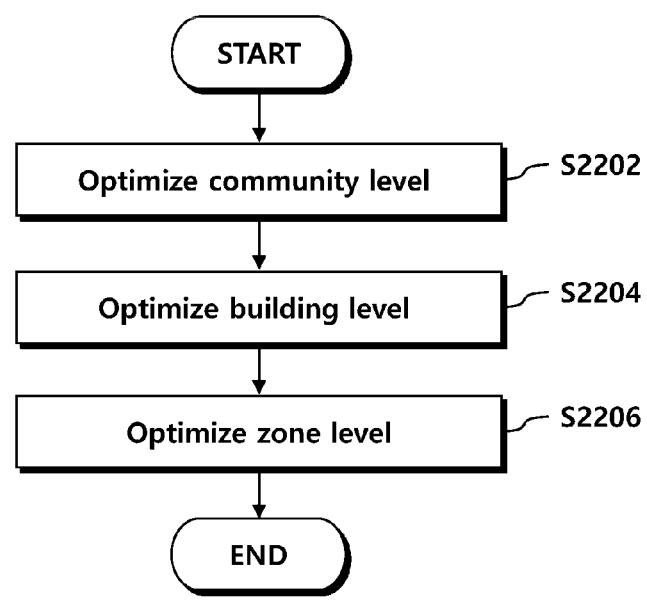
FIG. 22 is a flowchart of an energy optimization method according to an embodiment.

FIG. 22 is a flowchart of an energy optimization method according to an embodiment.

Referring to FIG. 22, the energy management system optimizes energy in a community level (S2202).

A community level may include a community device not belonging to each building. In a community level optimization stage, an optimal control scenario for the community device may be generated. When an optimal control scenario for the community device is generated, the energy management system may generate the optimal control scenario to minimize an energy cost. For example, the energy management system may use a demand response incentive and real time energy price information to adjust the energy usage of the community device for each time period or entirely, so that the energy cost can be minimized. Specifically, the energy management system may schedule, through real time energy price information, use of the community device in a time period in which an energy price is low, and, also, may schedule use of the community device to allow energy use to be reduced in a time period in which a demand response incentive is given.

The energy management system may generate an optimal control scenario for direct control with respect to a community device, and may generate an energy management policy for inducing maximization of the value of a particular objective function with respect to affiliated buildings, and then transmit the generated policy to a building agent of each building. The energy management policy relates to a policy for inducing maximization of the value of a particular objective function, rather than using a compulsory control signal. For example, the energy management policy may include a policy for inducing maximization of the value of a particular objective function, such as a demand response incentive policy, instead of a compulsory control signal, such as load blocking, and load scheduling.

The community agent may use an objective function allowing a total demand response incentive amount of a community to be maximized and may generate an energy management policy allowing the objective function to be maximized. For example, a subject managing a community agent may be an energy demand management company which recruits buildings to participate in a demand response in a community unit and manages the recruited buildings. The energy demand management company may be a company established with the purpose of maximizing a total demand response incentive amount of a community.

Otherwise, the energy demand management company may be a company established with the purpose of maximizing a profit through demand response participation. Then, an objective function used by a community agent may maximize a total amount of a demand management profit of a community. A demand management profit may be an amount obtained by excluding a building demand response incentive redistributed to each building from a community demand response incentive received from a power trading market. When a building demand response incentive is determined to be too high, a profit of a community demand response incentive may be reduced. On the contrary, when a building demand response incentive is determined to be too low, a demand response compliance index of each building may become small, whereby a profit of a community demand response incentive may be reduced. The energy management system may generate an energy management policy in consideration of the above description.

When the energy management policy is transmitted to a building agent, the energy management system optimizes energy in a building level (S2204).

A building level may include a building device not belonging to each zone. In a building level optimization stage, an optimal control scenario for the building device may be generated. When an optimal control scenario for the building device is generated, the energy management system may generate the optimal control scenario to minimize an energy cost. For example, the energy management system may use a demand response incentive and real time energy price information to adjust the energy usage of the building device for each time period or entirely, so that the energy cost can be minimized. Specifically, the energy management system may schedule, through real time energy price information, use of the building device in a time period in which an energy price is low, and, also, may schedule use of the building device to allow energy use to be reduced in a time period in which a demand response incentive is given.

Then, the demand response incentive may be included in an energy management policy received from a community agent. A building agent generates an optimal control scenario in consideration of an energy management policy received from a community agent. Therefore, the building agent is not directly controlled by the community agent, but may maintain an indirect control relation with the community agent.

The energy management system may generate an optimal control scenario for direct control with respect to a building device, and may generate an energy management policy for inducing maximization of the value of a particular objective function with respect to affiliated zones, and then transmit the generated policy to a zone agent of each zone. The energy management policy relates to a policy for inducing maximization of the value of a particular objective function, rather than using a compulsory control signal. For example, the energy management policy may include a policy for inducing maximization of the value of a particular objective function, such as a demand response incentive policy, instead of a compulsory control signal, such as load blocking, and load scheduling.

The building agent may use an objective function allowing minimization of an energy cost of a building and may generate an energy management policy allowing the objective function to be minimized.

An energy management policy which a community agent transmits to each building agent or an energy management policy which a building agent transmits to each zone agent may be determined to be different for each building agent or for each zone agent, respectively. For example, a building agent may differently determine a first energy management policy for a first zone agent and a second energy management policy for a second zone agent. When a demand response incentive policy is used as an energy management policy, the demand response load capacity which allows reception of a demand response incentive has been already determined. Therefore, it is required to property distribute a demand response load capacity to each building or each zone and provide a proper incentive to a load having participated in a demand response. To this end, the community agent differently generates an energy management policy for each building agent so as to create a maximum demand management profit through each building agent. In addition, the building agent differently generates an energy management policy for each zone agent so as to minimize the energy cost for the entire building.

When the energy management policy is transmitted to a zone agent, the energy management system optimizes energy in a zone level (S2206).

A lower level does not exist in the zone level. Therefore, it may be important to generate an optimal control scenario for all controllable devices (loads). The energy management system generates a control scenario in consideration of even the convenience of users who reside in each zone, as well as an energy cost. Therefore, an objective function may be different from that of other levels.

When generating an optimal control scenario of a zone, the energy management system may further consider user configuration information, indoor and outdoor environment information, energy use pattern information for each device, and occupant information, etc., as well as an energy management policy, to generate an optimal control scenario. Said pieces of information may be used for considering user convenience.

For convenience of understanding, a case where a demand response incentive policy is used as an energy management policy will be explained as an example in the following description.

Figure 23:
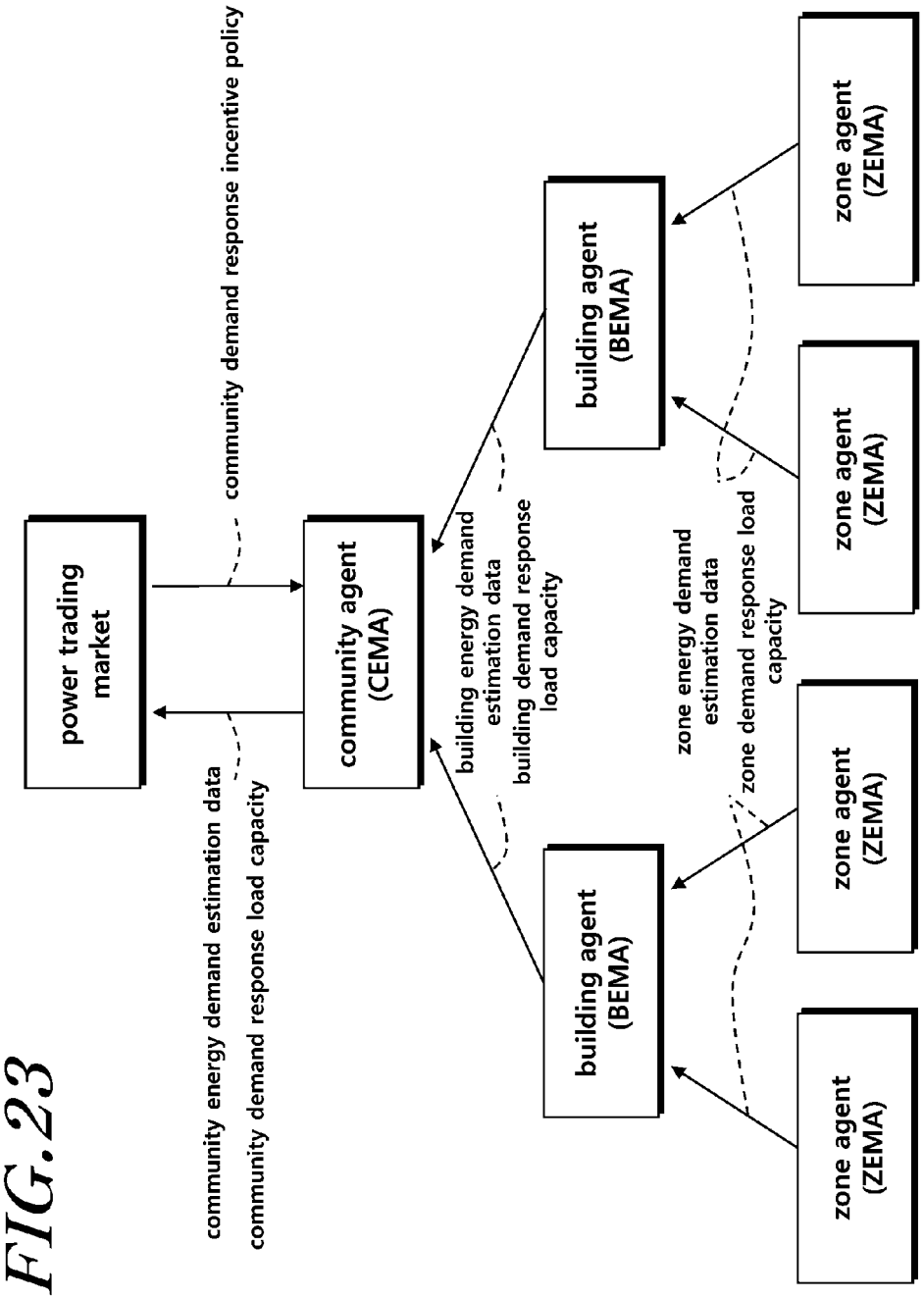
FIG. 23 is a diagram showing a procedure in which a community demand response incentive policy is determined in an energy management system according to an embodiment.

FIG. 23 is a diagram showing a procedure in which a community demand response incentive policy is determined in an energy management system according to an embodiment.

Referring to FIG. 23, each zone agent (ZEMA) computes zone energy demand estimation data and a zone demand response load capacity and then transmits the computed data and capacity to a building agent (BEMA). Each zone agent (ZEMA) may not transmit the zone demand response load capacity to the building agent (BEMA). The building agent (BEMA) may compute a load capacity estimated to participate in a demand response in each zone and then manage the computed load capacity.

The building agent (BEMA) gathers zone energy demand estimation data and adds up energy demand estimation data about a building device not belonging to each zone to generate building energy demand estimation data. The building agent (BEMA) gathers a zone demand response load capacity and computes a demand response load capacity about a building device not belonging to each zone to generate a building demand response load capacity. Then, the building agent (BEMA) transmits the building energy demand estimation data and the building demand response load capacity to a community agent (CEMA). The building agent (BEMA) may not transmit the building demand response load capacity to the community agent (CEMA). The community agent (CEMA) may compute a load capacity estimated to participate in a demand response in each building and then manage the computed load capacity.

The community agent (CEMA) gathers building energy demand estimation data and adds up energy demand estimation data about a community device not belonging to each building to generate community energy demand estimation data. The community agent (CEMA) gathers a building demand response load capacity and computes a demand response load capacity about a community device not belonging to each building to generate a community demand response load capacity. The community demand response load capacity may be a value estimated through a machine learning model. In an embodiment in which the community agent (CEMA) does not receive a load capacity to participate in a demand response from each building agent (BEMA), the community agent (CEMA) may estimate a community demand response load capacity and then manage the estimated capacity.

The community agent (CEMA) may bid for a demand response system by using the community energy demand estimation data and the community demand response load capacity and may receive a community demand response incentive policy as a result of the bidding.

The community demand response incentive policy may be a demand response load capacity and a price policy. For example, the community demand response incentive policy may be a load capacity having participated in a demand response and a price policy for the load capacity. In a further specific embodiment, the community demand response incentive policy may be the magnitude of the load capacity and a price per KW with respect to the load capacity. The price may be determined differently according to units of time. The building demand response incentive policy or the zone demand response incentive policy may be a demand response load capacity and a price policy about the demand response load capacity.

Figure 24:
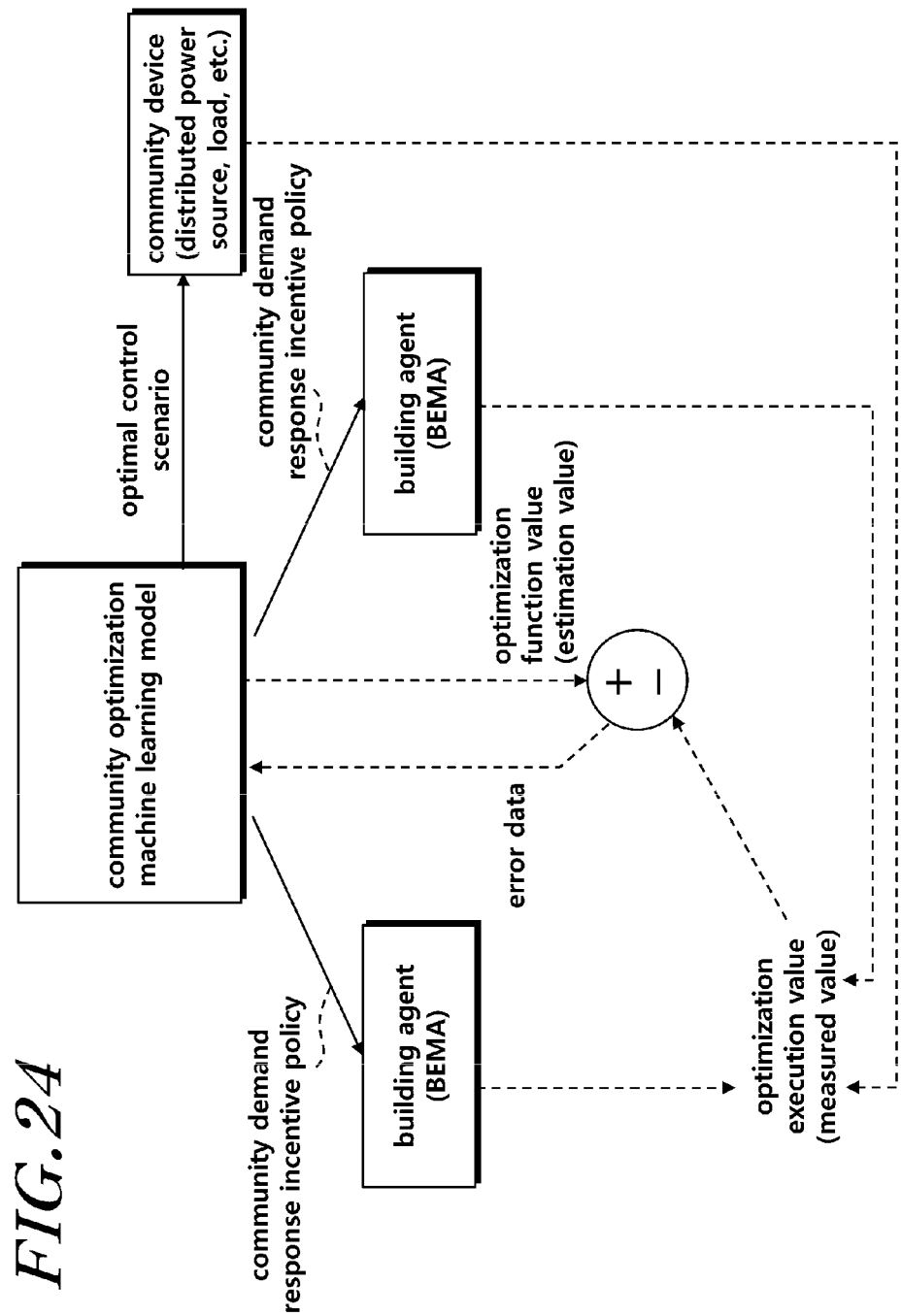
FIG. 24 is a diagram for explaining an optimization procedure in a community level according to an embodiment.

FIG. 24 is a diagram for explaining an optimization procedure in a community level according to an embodiment.

Referring to FIG. 24, a machine learning device may generate an optimal control scenario about a community device through a community optimization machine learning model.

A community agent may obtain state information of at least one community device among a community load, a community distributed power source, a community Energy Storage System (ESS) and a community Electric Vehicle (EV) charging station, which does not belong to a building, and then transmit the obtained information to a machine learning device.

Then, the machine learning device may generate an optimal control scenario about a community device using the state information of the community device and a community demand response incentive policy. The machine learning device may generate an optimal control scenario minimizing an energy cost of the community device.

When the optimal control scenario generated in the machine learning device is transmitted to the community agent, the community agent may control community devices according to the optimal control scenario.

The machine learning device may generate a building demand response incentive policy to be applied to each building through a community optimization machine learning model including, as input data, building energy demand estimation data and building energy usage data for each building, and a community demand response incentive policy. The generated building demand response incentive policy may be different according to buildings.

The community optimization machine learning model may generate a building demand response incentive policy so as to allow a particular optimization function to be maximized or minimized. The community optimization machine learning model may perform machine learning according to error data obtained by a difference between an estimation value and a measured value about an optimization function.

For example, an optimization function may be a function about a community demand management profit. Then, the community optimization machine learning model may generate a building demand response incentive policy for each building to allow a community demand management profit to be maximized. However, a demand response may not proceed in a direction expected by each building. In this case, the community optimization machine learning model determines that an internal parameter is not optimized and then may perform machine learning according to error data obtained by a difference between an estimation value and a measured value.

For example, the machine learning device may generate an estimation value of a community demand management profit through the community optimization machine learning model and may receive a measured value of the community demand management profit from the community agent. The machine learning device may train the community optimization machine learning model using error data according to a difference between the estimation value and the measured value.

In another example, the machine learning device may generate an estimation value of a demand management profit in view of a community for each building through the community optimization machine learning model, and may receive a measured value of a demand response incentive profit for each building from the community agent. Then, the machine learning device may train the community optimization machine learning model using error data according to a difference between the estimation value and the measured value.

The community optimization machine learning model may calculate a demand response load capacity for each building, as a building demand response incentive policy. In this embodiment, the machine learning device may train the community optimization machine learning model using error data according to a difference between a demand response load capacity calculated for each building through the community optimization machine learning model and a load capacity actually having participated in a demand response for each building.

The community optimization machine learning model may generate a demand response compliance index for each building. The demand response compliance index may be used as an internal parameter of the community optimization machine learning model and may be used to calculate an energy price and a demand response load capacity to be allocated for each building.

The demand response compliance index may be used in machine learning. The community optimization machine learning model may further generate a demand response compliance index estimation value for each building and the machine learning device may train the community optimization machine learning model using error data according to a difference between the demand response compliance index estimation value and a measured value.

Figure 25:
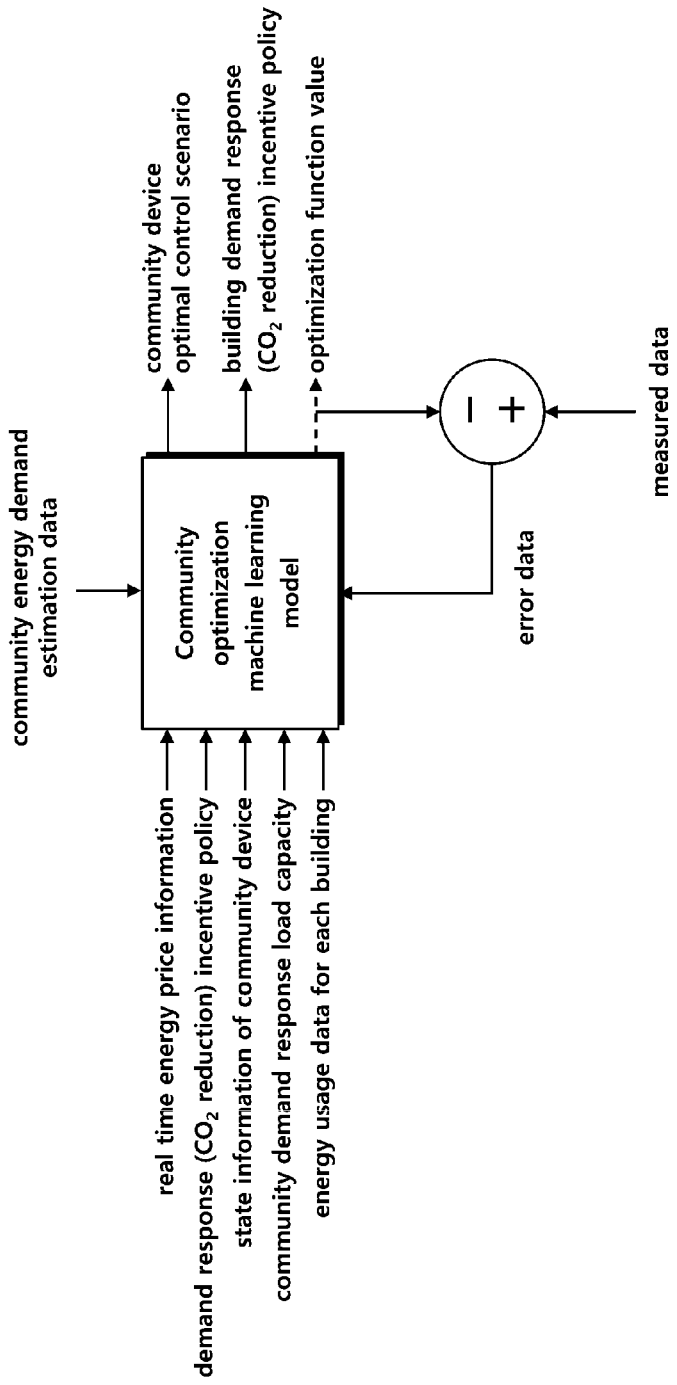
FIG. 25 is a configuration diagram of a community optimization machine learning model according to an embodiment.

FIG. 25 is a configuration diagram of a community optimization machine learning model according to an embodiment.

Referring to FIG. 25, a community optimization machine learning model may include, as input data, real time energy price information, a demand response incentive policy, a CO2 reduction incentive policy, state information of a community device, energy usage data for each building, and community energy demand estimation data.

The machine learning device may generate a community device optimal control scenario through the community optimization machine learning model. The machine learning device may generate a building demand response incentive policy for each building through the community optimization machine learning model. Depending on embodiments, the machine learning device may further generate a CO2 reduction incentive policy for each building.

The community optimization machine learning model may generate output values so as to allow an optimization function to be maximized or minimized.

The community optimization machine learning model may generate an optimization function value as an output and use the generated optimization function value in machine learning by comparing the generated optimization function value with measured data. The community optimization machine learning model may further include, as input data, a demand response compliance index for each building. A demand response compliance index may be generated by a community agent and then transmitted to the machine learning device.

Figure 26:
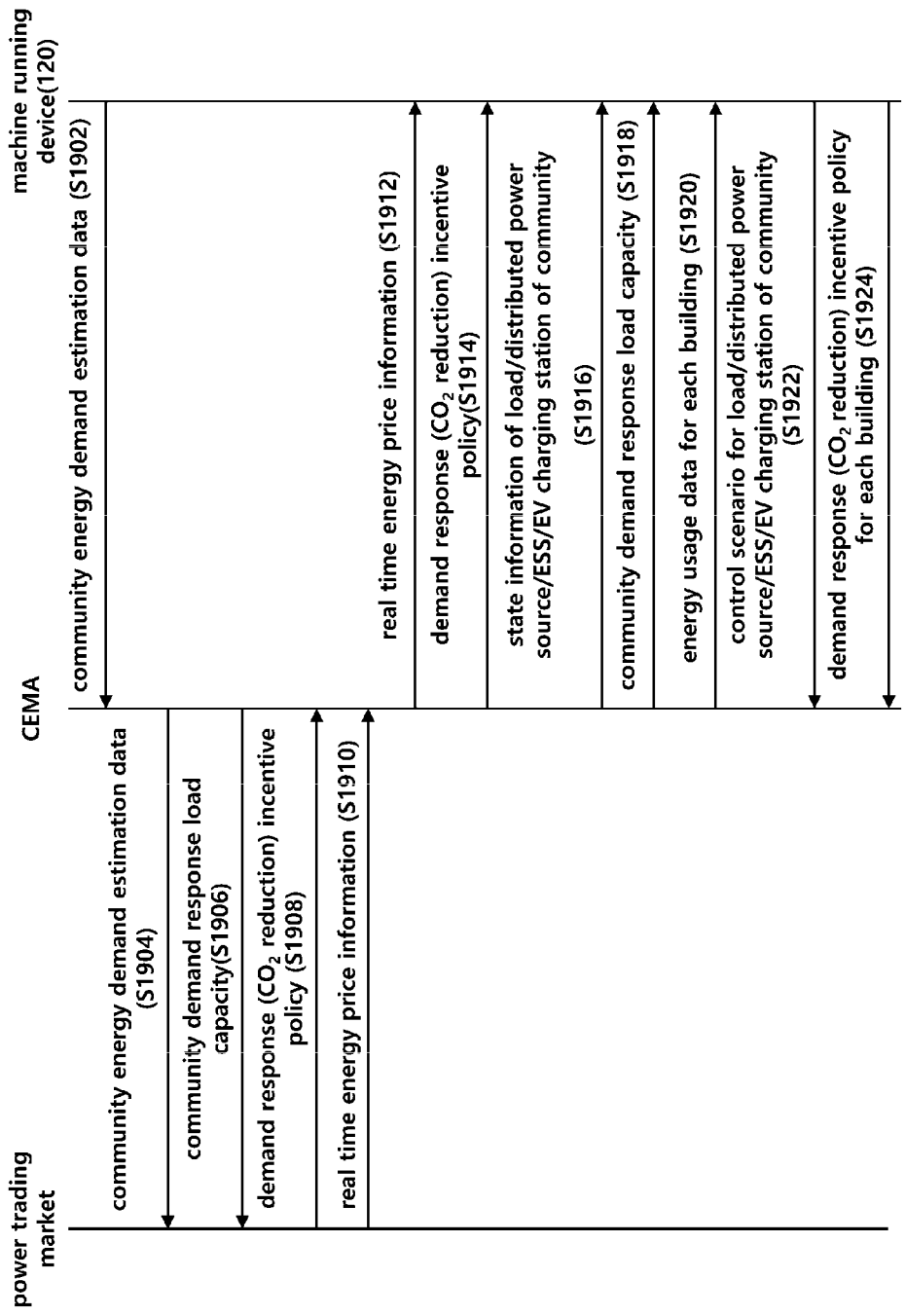
FIG. 26 is a signal flow diagram of a method for generating a community optimal control scenario according to an embodiment.

FIG. 26 is a signal flow diagram of a method for generating a community optimal control scenario according to an embodiment.

The community agent (CEMA) may manage a demand response load capacity about a community and receive real time energy price information, a demand response incentive policy, and a CO2 reduction incentive policy from a power trading market. The demand response incentive policy and CO2 reduction incentive policy may be a value which the community agent (CEMA) receives as a result of bidding for a demand response system by using community energy demand estimation data and a demand response load capacity for a community. The community agent (CEMA) may periodically or aperiodically update the demand response incentive policy and CO2 reduction incentive policy through the bidding.

Referring to FIG. 26, the machine learning device 120 generates community energy demand estimation data and transmits the generated community energy demand estimation data to the community agent (CEMA) (S1902).

Then, the community agent (CEMA) transmits the community energy demand estimation data to the power trading market (S1904), and transmits a demand response load capacity capable of participating in a demand response in a community to the power trading market (S1906).

The power trading market (a server managing a power trading market by hardware) may transmit a demand response incentive policy and a CO2 reduction incentive policy to the community agent (CEMA) in response to the information (S1908).

The demand response incentive policy may include information of the capacity, a time, etc. of a load required to participate in a demand response and information about an incentive during participation in a demand response. The CO2 reduction incentive policy may include incentive information according to new regeneration energy-specific usage.

The power trading market may transmit real time energy price information to the community agent (CEMA) (S1910).

The community agent (CEMA) may transmit the real time energy price information to the machine learning device 120 (S1912), and may transmit the demand response incentive policy and the CO2 reduction incentive policy to the machine learning device (S1914).

Then, the community agent (CEMA) may transmit state information of a community device to the machine learning device 120 (S1916), and may transmit energy usage data for each building to the machine learning device 120 (S1920).

The machine learning device 120 may generate a demand response incentive policy for each building, a CO2 reduction incentive policy for each building, a control scenario for a community device through a community optimization machine learning model including, as input data, real time energy price information, a demand response incentive policy, a CO2 reduction incentive policy, state information of a community device, energy usage data for each building, and community energy demand estimation data, and then transmit the generated policies and scenario to the community agent (CEMA) (S1922 and S1924).

The community agent (CEMA) may control the community device according to the control scenario about the community device and may transmit the demand response incentive policy and CO2 reduction incentive policy for each building to each building agent (BEMA).

The building agent may manage building energy demand estimation data including zone energy demand estimation data for each zone and a building demand response load capacity including a zone demand response load capacity for each zone and may manage a building demand response incentive policy applied to a building.

The machine learning device may generate a zone demand response incentive policy to be applied to each zone through a building optimization machine learning model including, as input data, zone energy demand estimation data for each zone and a building demand response incentive policy and calculating an energy cost about a building to be minimized and then transmit the generated policy to the building agent.

Then, the building agent may transmit the zone demand response incentive policy to a zone agent corresponding to each zone.

Figure 27:
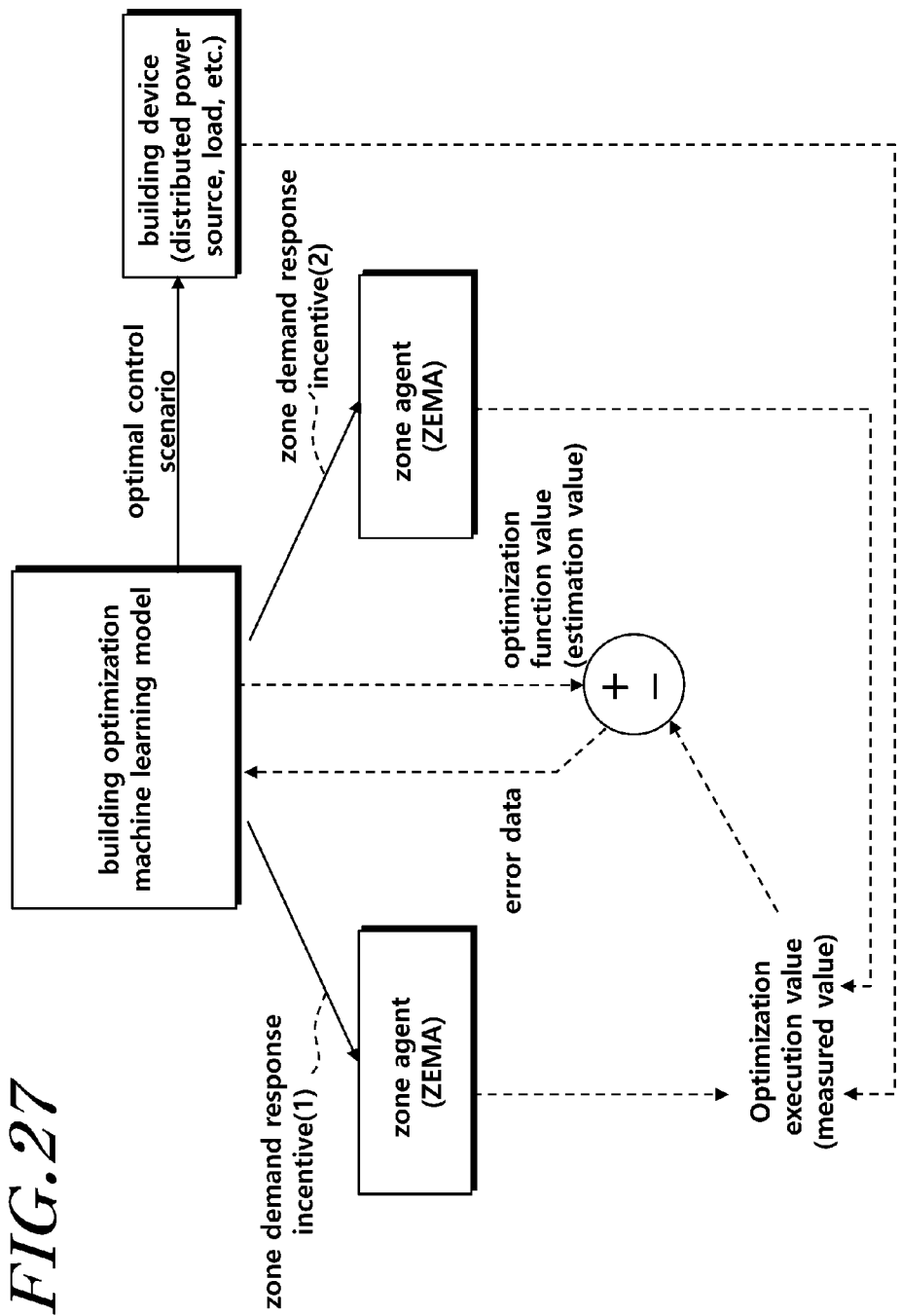
FIG. 27 is a diagram for explaining an optimization procedure in a building level according to an embodiment.

FIG. 27 is a diagram for explaining an optimization procedure in a building level according to an embodiment.

Referring to FIG. 27, a machine running device may generate an optimal control scenario about a building device through a building optimization machine learning model.

A building agent may obtain state information of at least one building device among a building load, a building distributed power source, a building ESS and a building EV charging station, which does not belong to a zone, and then transmit the obtained information to a machine learning device.

Then, the machine learning device may generate an optimal control scenario about a building device using the state information of the building device and a building demand response incentive policy. The machine learning device may generate an optimal control scenario to minimize an energy cost of the building device.

When the optimal control scenario generated in the machine learning device is transmitted to the building agent, the building agent may control building devices according to the optimal control scenario.

The machine learning device may generate a zone demand response incentive policy to be applied to each zone through a building optimization machine learning model including, as input data, zone energy demand estimation data and zone energy usage data for each zone, and a building demand response incentive policy. The generated zone demand response incentive policy may be different according to zones.

The building optimization machine learning model may generate a zone demand response incentive policy so as to allow a particular optimization function to be maximized or minimized. The building optimization machine learning model may perform machine learning according to error data obtained by a difference between an estimation value and a measured value about an optimization function.

For example, an optimization function may be a function about a building energy cost. Then, the building optimization machine learning model may generate a zone demand response incentive policy for each zone to allow a building energy cost to be minimized. However, a demand response may not proceed in a direction expected by each zone. In this case, the building optimization machine learning model determines that an internal parameter is not optimized and then may perform machine learning according to error data obtained by a difference between an estimation value and a measured value.

Figure 28:
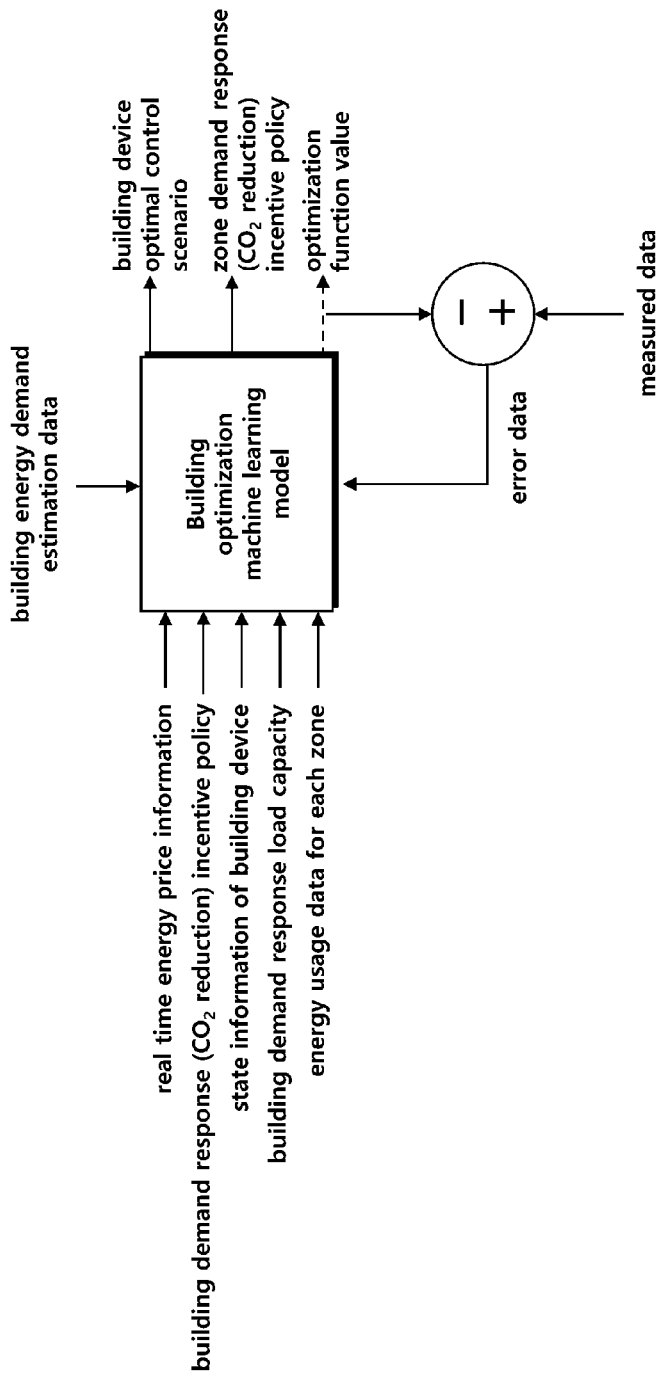
FIG. 28 is a configuration diagram of a building optimization machine learning model according to an embodiment.

FIG. 28 is a configuration diagram of a building optimization machine learning model according to an embodiment.

Referring to FIG. 28, a building optimization machine learning model may include, as input data, real time energy price information, a demand response incentive policy and $CO_2$ reduction incentive policy for each building, state information for each building device, energy usage data for each zone, and building energy demand estimation data for each building.

The machine learning device may generate a demand response incentive policy for each zone, a $CO_2$ reduction incentive policy for each zone, and a control scenario for each building device through the building optimization machine learning model.

The building optimization machine learning model may generate output values to allow a second optimization function to be minimized.

The second optimization function is a function to allow the energy usage of the entire building to be minimized, an incentive according to a demand response to be maximized, and an incentive according to $CO_2$ reduction to be maximized.

Figure 29:
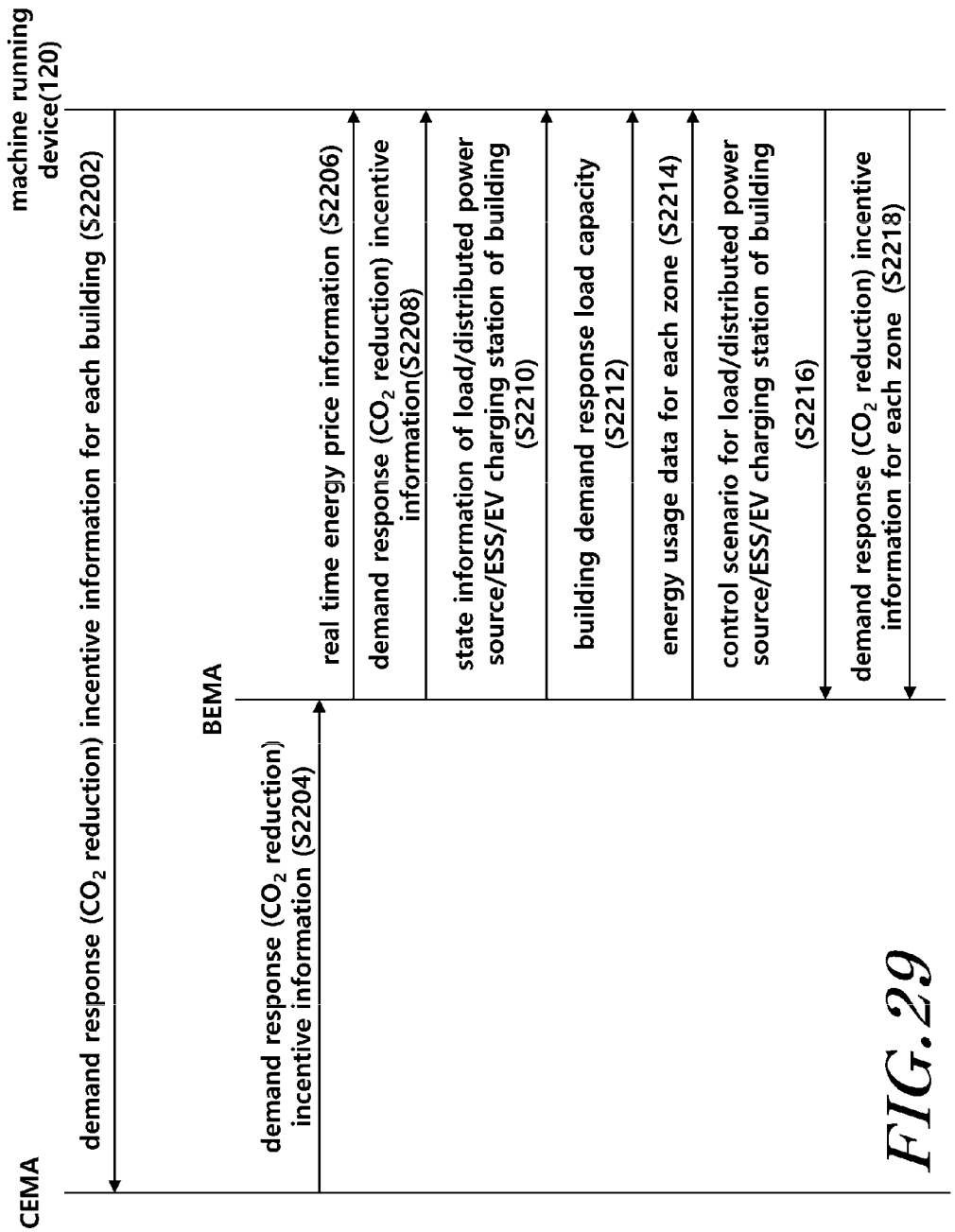
FIG. 29 is a signal flow diagram of a method for generating a building optimal control scenario according to an embodiment.

FIG. 29 is a signal flow diagram of a method for generating a building optimal control scenario according to an embodiment.

Referring to FIG. 29, the machine learning device 120 may transmit a demand response incentive policy and $CO_2$ reduction incentive policy for each building to the community agent (CEMA) (S2202), and the community agent (CEMA) may transmit the demand response incentive policy and $CO_2$ reduction incentive policy for each building to the building agent (BEMA) (S2204).

Then, the building agent (BEMA) may transmit real time energy price information, the demand response incentive policy and $CO_2$ reduction incentive policy for each building, state information of a building device, demand response load information of a building, energy usage data for each zone, etc. to the machine learning device 120 (S2206, 52208, 52210, 52212, and S2214).

Then, the machine learning device 120 may generate a demand response incentive policy for each zone, a $CO_2$ reduction incentive policy for each zone, and a control scenario for each building device through a building optimization machine learning model including, as input data, real time energy price information, a demand response incentive policy and $CO_2$ reduction incentive policy for each building, state information for each building device, energy usage data for each zone, and building energy demand estimation data for each building, and then transmit the generated policies and scenario to the building agent (BEMA) (S2216 and S2218).

The machine learning device 120 may calculate a demand response load capacity and demand response compliance index for each zone, and may generate a demand response incentive policy and $CO_2$ reduction incentive policy for each zone by using the demand response load capacity and demand response compliance index for each zone.

Figure 30:
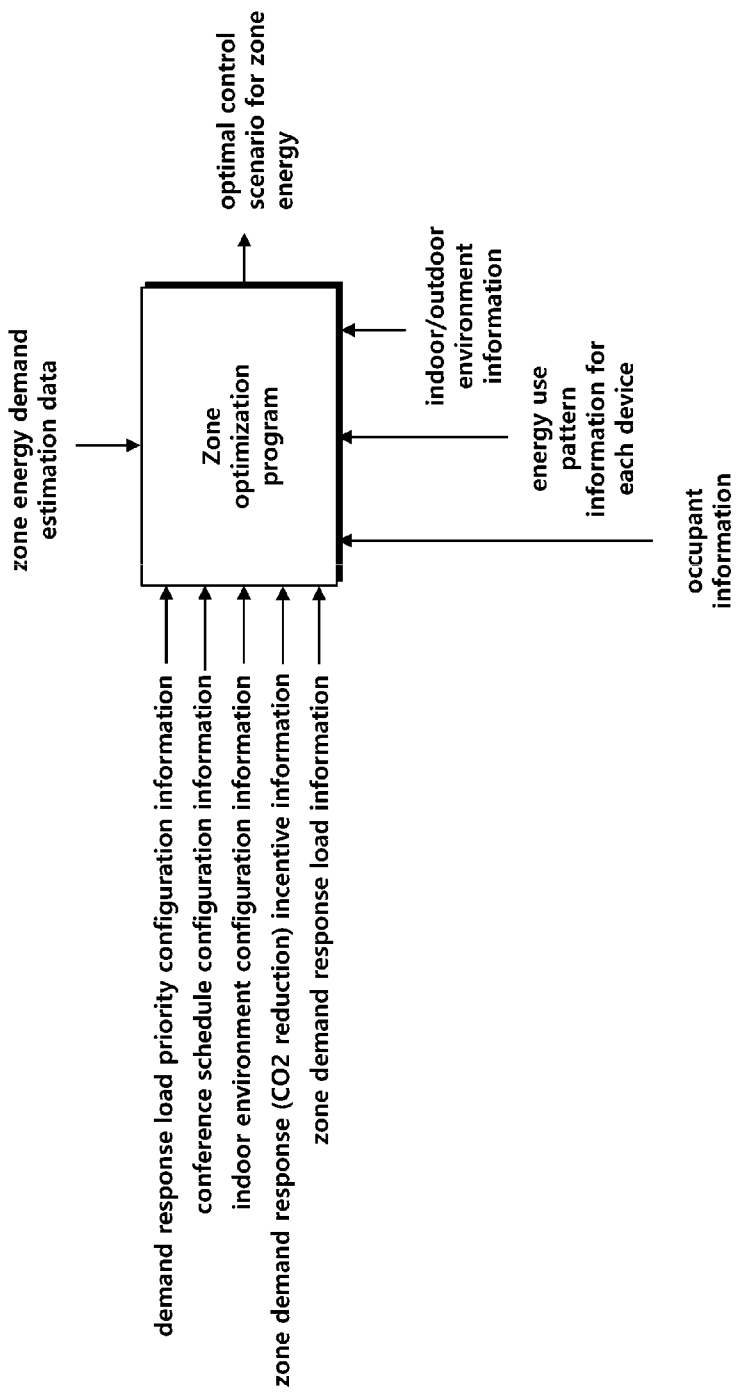
FIG. 30 is a configuration diagram of a zone optimization program generating an optimization control scenario for each zone according to an embodiment.
Figure 31:
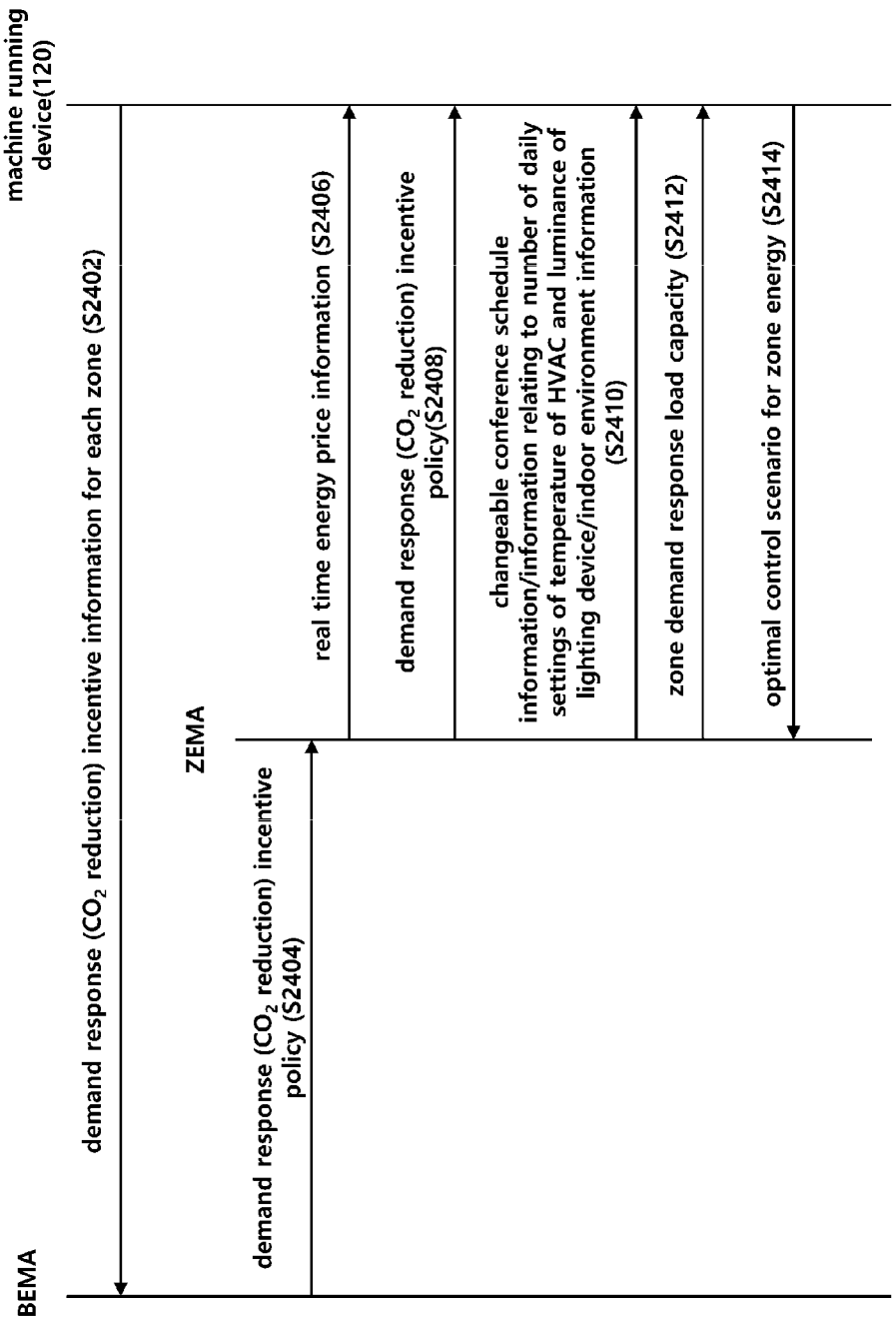
FIG. 31 is a signal flow diagram of a method for generating an optimal control scenario for each zone according to an embodiment.

FIG. 30 is a configuration diagram of a zone optimization program generating an optimization control scenario for each zone according to an embodiment, and FIG. 31 is a signal flow diagram of a method for generating an optimal control scenario for each zone according to an embodiment.

A zone agent (ZEMA) may manage demand response load information for each zone and may receive a demand response incentive policy and $CO_2$ reduction incentive policy for each zone from a building agent (BEMA).

Referring to FIG. 30, a zone optimization program that generates an optimal control scenario for each zone may include, as input data, real time energy price information, a demand response incentive policy and $CO_2$ reduction incentive policy for each zone, occupant information for each zone, device energy usage data (or energy use pattern information for each device) of an energy device and a personal device which are operated in each zone, and zone energy demand estimation data for each zone.

In another example, the zone optimization program may include, as input data, user configuration information, indoor and outdoor environment information, energy use pattern information for each device, occupant information, zone demand response load information, and zone energy demand estimation data. The user configuration information may be, for example, demand response priority configuration information, conference schedule configuration information, indoor environment configuration information, etc.

The machine learning device may generate an optimal control scenario for an energy device and a personal device which are operated in each zone, through the zone optimization program.

The zone agent may further manage conference schedule configuration information and information relating to the number of daily temperature or luminance settings of an energy device and the zone optimization program may further include, as input data, the conference schedule configuration information and the information on the number of settings to generate an optimal control scenario about a conference schedule, indoor temperature, indoor luminance, etc.

The zone optimization program may further include user configuration information as input data. For example, the zone agent (ZEMA) may include a UI device and may generate priority information of a load device to participate in a demand response, changeable conference schedule information, desired indoor environment information (for example, temperature, humidity, luminance, fine dust, etc.)

to input the generated pieces of information as user configuration information to the zone optimization program. A zone agent (ZEMA) in which an input of an occupant does not exist may generate a default value or a previously configured value, as user configuration information.

The zone optimization program may generate a control scenario to allow a third optimization function to be minimized (or maximized).

The optimal control scenario includes an operation command value for each device. Therefore, the zone agent (ZEMA) may control each device according to the operation command value. A control scenario for a building device and a control scenario for a community device may include operation command values, as well. Respective agents (BEMA and CEMA) may control corresponding devices according to the operation command values.

Referring to FIG. 31, the machine learning device 120 may transmit a demand response incentive policy and CO2 reduction incentive policy for each zone to the building agent (BEMA) (S2402), and the building agent (BEMA) may transmit the demand response incentive policy and CO2 reduction incentive policy for each zone to the zone agent (ZEMA) (S2404).

Then, the zone agent (ZEMA) may transmit real time energy price information, the demand response incentive policy and CO2 reduction incentive policy for each zone, the number of occupants for each zone, device energy usage data of an energy device and a personal device which are operated in each zone, and zone energy demand estimation data for each zone to the machine learning device 120 (S2406, S2408, and S2410).

The machine learning device may generate a control scenario about an energy device and a personal device which are operated in each zone, through the zone optimization program, and then transmit the generated scenario to the zone agent (ZEMA) (S2414).

When an upper agent receives a DR/FR signal, the upper agent may retransmit the DR/FR signal to a lower agent so as to properly secure a bid response capacity. Then, different DR/FRs may be transmitted to a plurality of lower agents.

Figure 32:
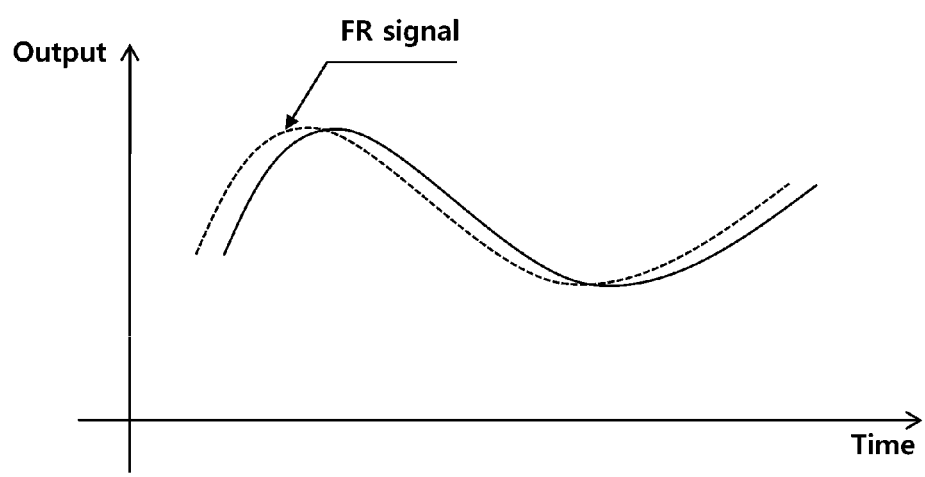
FIG. 32 is a diagram exemplarily showing an output curve of a load that does not properly follow a frequency regulation.

FIG. 32 is a diagram exemplarily showing an output curve of a load that does not properly follow a frequency regulation.

Referring to FIG. 32, a load may follow an FR signal while having a predetermined delay according to a dynamic characteristic. For example, in an HVAC device supplying thermal energy to a building, the HVAC may follow an FR signal while having a predetermined delay according to thermal dynamics of the building.

An energy management system according to an embodiment may transmit a DR/FR signal to a lower agent in consideration of a dynamic characteristic and a response capacity with respect to DR/FR of the lower agent in order to respond to the DR/FR from the viewpoints of time and capacity.

Figure 33:
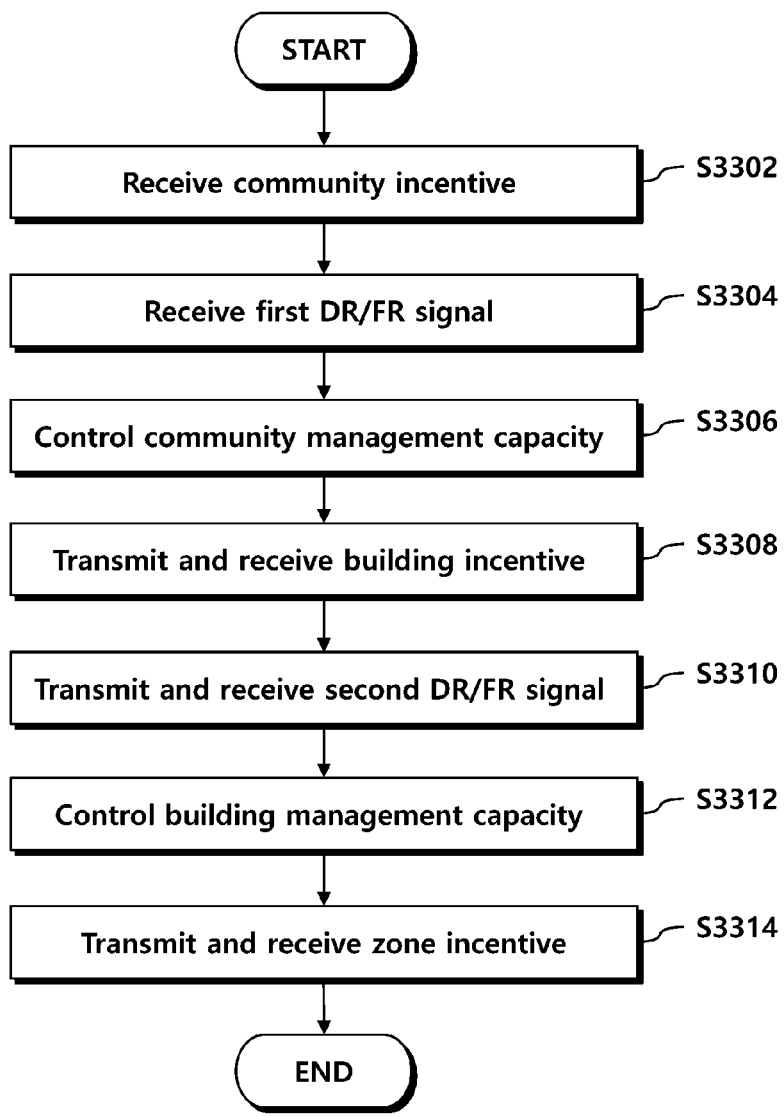
FIG. 33 is a flowchart of a method for controlling each agent device in response to a DR/FR signal by an energy management system according to an embodiment.

FIG. 33 is a flowchart of a method for controlling each agent device in response to a DR/FR signal by an energy management system according to an embodiment.

Referring to FIG. 33, a community agent may receive a community incentive about a demand response or a frequency regulation from a demand management device (S3302).

The community agent may receive first DR/FR signal corresponding to the community incentive (S3304).

The community agent may control a response capacity responding to the community incentive among a community management capacity in response to the first DR/FR signal (S3306).

The community agent may discharge an ESS in response to the first DR/FR signal and may adjust the power consumption of a community common load.

The community agent may transmit a building incentive to each building agent to allow the building agent to respond to the DR/FR signal (S3308). The transmitted building incentive may have a value slightly different from a building incentive transmitted to calculate a response capacity explained with reference to FIG. 21. As described above with reference to FIG. 21, the community agent may transmit a building incentive to the building agent to identify a response capacity by which the building agent can participate. When the identified response capacity is smaller or larger than a capacity expected by the community agent, the community agent may change the building incentive and then transmit the changed building incentive when the community agent performs control in response to an actual DR/FR signal.

Then, the community agent may transmit a second DR/FR signal corresponding to the building incentive to each building agent (S3310). Load characteristics of buildings may be different from each other. For example, response times of buildings with respect to the second DR/FR signal may be different.

The community agent may transmit different second DR/FR signals to at least two building agents according to load characteristic of each building.

The community agent may determine a second DR/FR signal to be transmitted to each building agent through machine learning including, as input data, a degree of DR/FR compliance, a degree of DR/FR contribution (a degree by which increasing a response capacity in a DR/FR section or a section, such as a peak time, in which an incentive is high or a real time power price is high contributes to a DR/FR incentive profit), etc. of each building agent.

The building agent may receive the second DR/FR signal and may control a response capacity responding to the building incentive among a building management capacity in response to the second DR/FR signal (S3312).

The load characteristic of each building may be determined by a peak power time period of each building. In a commercial building, a peak power time period may appear in a daytime, and in a residential building, a peak power time period may appear in a night time. Even in the same commercial buildings, a building for transportation, for example, a building for a subway and a building for a bus, may have a peak power time period in a commuting time, and an office building may have a peak power time period in a time ranging from two to three in the afternoon. The community agent may transmit different second DR/FR signals depending on a peak power time period of each building.

The building agent may control a thermal energy device to accumulate thermal energy in a building in a time period in which the price of power is low, in consideration of the thermal dynamics of the building.

Then, the building agent may transmit a zone incentive to a zone agent (S3314).

The building agent may generate the zone incentive through machine learning including, as input data, an energy demand for each zone, a DR/FR-available load capacity, a degree of DR/FR compliance, a degree of DR/FR contribution, etc.

The zone agent may control a response capacity responding to the zone incentive among a zone management capacity to participate in a demand response or frequency regulation.

The transmitted zone incentive may have a value slightly different from a zone incentive transmitted to calculate a response capacity explained in reference to FIG. 21. As described above with reference to FIG. 21, the building agent may transmit a zone incentive to the zone agent to identify a response capacity by which the zone agent can participate. When the identified response capacity is smaller or larger than a capacity expected by the building agent, the building agent may change the zone incentive and then transmit the changed zone incentive when the building agent performs control in response to an actual DR/FR signal.

FIG. 34 is an internal configuration diagram of an xEMA.

The zone agent (ZEMA), the building agent (BEMA), and the community agent (CEMA) may all have the same structure of an xEMA. Each agent (ZEMA, BEMA, or CEMA) may configure some configuration thereof to be active or non-active as needed.

An xEMA may include: a local DB 2402 that locally stores data; a weather device 2404 that obtains weather information or external air data; a demand response device 2406 that manages demand response information and processes a demand response command value; a real time price device 2408 that manages a real time energy price of power; a hierarchy management device 2410 that manages the hierarchical structure of an agent; a configuration management device 2412 that diagnoses a breakdown of an agent; a Machine Learning (ML) device 2414 that manages machine learning and the other controls; a sensor measurement device 2416 that obtains environment data from a sensor; an electrical device measurement device 2418 that obtains energy usage data from an electrical device; a distributed power source control device 2420 that obtains state information of a distributed power source and controls the distributed power source; an ESS control device 2422 that obtains state information of an ESS and controls the ESS; an EV charging station control device 2424 that obtains state information of an EV charging station and controls the EV charging station; a load management device 2426 that controls and manages a load; a UI device 2428 that provides a user interface; etc.

As described above, according to the present embodiment, an EMS device can reflect various (energy) environments in zones of a building, even when some breakdown occurs, the reliability of the entire system does not degrade, a device can be plug and play (Plug & Play), the current occupied status, the energy use pattern, and the convenience of a resident can be reflected. In addition, the present disclosure can provide an energy management system technology allowing user convenience and an energy cost according to zones in a building to be optimally determined. Moreover, according to the present disclosure, the problem of a conventional top-down scheme (a centralized integrated control scheme) can be solved, and an energy management policy for the entire region can be determined by reflecting an independent energy management policy for each zone.

In addition, since terms, such as "including" "comprising" and "having" mean that one or more corresponding elements may exist unless they are specifically described to the contrary, it shall be construed that one or more other elements can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An energy management system of a building divided into a plurality of zones,
the energy management system comprising:
a building agent that is a device managing energy of the building and is configured to receive a first incentive about a Demand Response (DR) or a Frequency Regulation (FR) from a community agent configured to manage energy of a community comprising the building, calculate a first response capacity responding to the first incentive among a building management capacity, and transmit a second incentive to a zone agent; and
a plurality of zone agents, each of which is a device managing energy of a corresponding zone and is configured to, when the each of zone agents does not participate in the demand response or the frequency regulation (case 1), estimate an energy demand amount (a first energy demand amount) of the corresponding zone through machine learning (first machine learning) or calculation, when the each of zone agents participates in the demand response or the frequency regulation (case 2), estimate an energy demand amount (a second energy demand amount) of the corresponding zone through machine learning (second machine learning), determine, as a second response capacity responding to the second incentive, a difference between the first energy demand amount and the second energy demand amount, and transmit the determined second response capacity to the building agent, wherein the building agent is configured to receive second response capacities from the plurality of zone agents and transmit a third response capacity obtained by adding the plurality of second response capacities and the first response capacity to the community agent, and the second machine learning comprises, as input data, the first energy demand amount and the second incentive and calculates the second energy demand amount to maximize an objective function comprising an incentive profit obtained by the second incentive and the second response capacity and a quantified user satisfaction degree.

2. The energy management system of claim 1, wherein each of the zone agents is configured to set whether to allow each occupant of the corresponding zone to participate in the demand response or in the frequency regulation.

3. The energy management system of claim 1, wherein each of the zone agents is configured to store user configurations for case 1 and case 2, respectively.

4. The energy management system of claim 3, wherein each of the zone agents is configured to store the user configuration for case 1 to be a particular value and the user configuration for case 2 to be a range.

5. The energy management system of claim 4, wherein each of the zone agents is configured to quantify a user satisfaction degree for each detail section in the range and store a quantified value of the degree.

6. The energy management system of claim 1, wherein each of the zone agents is configured to further receive incentive information from the building agent,
the incentive information comprises a load capacity ranking and an incentive ranking of a zone corresponding to a relevant zone agent among all the zones of the building, and
the second energy demand capacity is calculated through the second machine learning comprising, as input data, the load capacity ranking and the incentive ranking.

7. The energy management system of claim 1, wherein the second machine learning is independently executed for each zone and fails to recognize the second incentive of a different zone.

8. The energy management system of claim 1, wherein the building agent and the plurality of zone agents are configured to determine an internal variable through machine learning, and machine learnings corresponding to the building agent and the plurality of zone agents are operated independently and in parallel to each other.

\* \* \* \* \*